US008842013B2

(12) United States Patent
Sawyer

(10) Patent No.: US 8,842,013 B2
(45) Date of Patent: Sep. 23, 2014

(54) METHOD AND APPARATUS FOR TRACKING OBJECTS AND PEOPLE

(71) Applicant: Automated Tracking Solutions, LLC, Cherry Hill, NJ (US)

(72) Inventor: Frederick Sawyer, Alexandria, VA (US)

(73) Assignee: Automated Tracking Solutions, LLC, Cherry Hill, NJ (US)

(*) Notice: Subject to any disclaimer, the term of this patent is extended or adjusted under 35 U.S.C. 154(b) by 0 days.

(21) Appl. No.: 14/169,854

(22) Filed: Jan. 31, 2014

(65) Prior Publication Data

US 2014/0167966 A1 Jun. 19, 2014

Related U.S. Application Data

(63) Continuation of application No. 13/453,517, filed on Apr. 23, 2012, now Pat. No. 8,742,929, which is a continuation of application No. 12/901,889, filed on Oct. 11, 2010, now Pat. No. 8,279,069, which is a continuation of application No. 12/418,231, filed on Apr. 3, 2009, now Pat. No. 7,834,766, which is a continuation of application No. 11/185,854, filed on Jul. 21, 2005, now Pat. No. 7,551,089, which is a continuation-in-part of application No. 10/458,690, filed on Jun. 11, 2003, now Pat. No. 6,933,849.

(60) Provisional application No. 60/394,263, filed on Jul. 9, 2002.

(51) Int. Cl.
*G08B 13/14* (2006.01)

(52) U.S. Cl.
USPC ............................ 340/572.4; 340/571; 705/28

(58) Field of Classification Search
CPC ............ G08B 1/00; G08B 1/08; G08B 13/14; G08B 26/00; G08B 26/001; G08B 26/007; G08B 27/001; G08B 27/003; G08B 27/008
USPC ......... 340/539.1, 539.11, 539.13, 568.1, 571, 340/572.1, 572.4, 10.1, 10.4, 10.42; 235/384, 385; 702/150, 187; 75/22, 28
See application file for complete search history.

(56) References Cited

U.S. PATENT DOCUMENTS 4,075,632 A 2/1978 Baldwin et al.
4,424,579 A 1/1984 Roesner
(Continued)

FOREIGN PATENT DOCUMENTS

EP 0402129 A2 12/1990
EP 1126399 A2 8/2001
(Continued)

OTHER PUBLICATIONS

Office Action mailed Feb. 9, 2012 in reexamination U.S. Appl. No. 90/011,940.
(Continued)

*Primary Examiner* — Van T. Trieu
(74) *Attorney, Agent, or Firm* — Blank Rome LLP

(57) ABSTRACT

An object locating, identifying, tracking, and surveillance system, denoted the Assets Locating, Tracking, and Surveillance System (ALTSS), is provided for managing physical objects and evidence in environments such as police departments, law offices, and the Courts. ALTSS employs radio frequency identification (RFID) technology, computer programming and database applications, networking technologies, and hardware elements. ALTSS may locate and track physical evidence, merchandise, information carriers like files, folders or individual pieces of paper, and people, under certain conditions, in near-real time. It may be configured as part of a local area network, a wide area network, or the Internet. ALTSS may employ exemplary components such as RFID transponders, scanners, strategically located antennas and computers to facilitate tracking of objects and people as needed. Any number of users having access privileges and connected to the network may access ALTSS directly or remotely via the Internet to locate and track evidence or objects.

26 Claims, 18 Drawing Sheets

(56) References Cited

U.S. PATENT DOCUMENTS

| | | |
|---|---|---|
| 4,442,507 A | 4/1984 | Roesner |
| 4,462,022 A | 7/1984 | Stolarczyk |
| 4,525,713 A | 6/1985 | Barletta et al. |
| 4,796,074 A | 1/1989 | Roesner |
| 4,827,395 A | 5/1989 | Anders et al. |
| 4,847,485 A | 7/1989 | Koelsch |
| 4,884,208 A | 11/1989 | Marinelli et al. |
| 4,906,853 A | 3/1990 | Linwood et al. |
| 4,918,425 A | 4/1990 | Greenberg et al. |
| 4,924,211 A | 5/1990 | Davies |
| 4,933,735 A | 6/1990 | Potash et al. |
| 5,017,794 A | 5/1991 | Linwood et al. |
| 5,027,314 A | 6/1991 | Linwood et al. |
| 5,032,823 A | 7/1991 | Bower et al. |
| 5,095,362 A | 3/1992 | Roesner |
| 5,119,104 A | 6/1992 | Heller et al. |
| 5,148,256 A | 9/1992 | Potash et al. |
| 5,150,310 A | 9/1992 | Greenspun et al. |
| 5,204,670 A | 4/1993 | Stinton |
| 5,218,344 A | 6/1993 | Ricketts |
| 5,228,449 A | 7/1993 | Christ et al. |
| 5,276,496 A | 1/1994 | Heller et al. |
| 5,287,414 A | 2/1994 | Foster |
| 5,296,722 A | 3/1994 | Potash et al. |
| 5,301,353 A | 4/1994 | Borras et al. |
| 5,355,222 A | 10/1994 | Heller et al. |
| 5,363,425 A | 11/1994 | Mufti et al. |
| 5,387,993 A | 2/1995 | Heller et al. |
| 5,402,069 A | 3/1995 | Tabanou et al. |
| 5,407,851 A | 4/1995 | Roesner |
| 5,426,425 A | 6/1995 | Conrad et al. |
| 5,455,851 A | 10/1995 | Chaco et al. |
| 5,496,763 A | 3/1996 | Roesner |
| 5,528,232 A | 6/1996 | Verma et al. |
| 5,548,637 A | 8/1996 | Heller et al. |
| 5,572,195 A | 11/1996 | Heller et al. |
| 5,583,819 A | 12/1996 | Roesner et al. |
| 5,589,821 A | 12/1996 | Sallen et al. |
| 5,627,544 A | 5/1997 | Snodgrass et al. |
| 5,635,693 A | 6/1997 | Benson et al. |
| 5,640,151 A | 6/1997 | Reis et al. |
| 5,648,765 A | 7/1997 | Cresap et al. |
| 5,664,113 A | 9/1997 | Worger et al. |
| 5,686,341 A | 11/1997 | Roesner |
| 5,708,423 A | 1/1998 | Ghaffari et al. |
| 5,735,742 A | 4/1998 | French |
| 5,742,237 A | 4/1998 | Bledsoe |
| 5,745,036 A | 4/1998 | Clare |
| 5,768,140 A | 6/1998 | Swartz et al. |
| 5,774,876 A | 6/1998 | Woolley et al. |
| 5,793,290 A | 8/1998 | Eagleson et al. |
| 5,801,628 A | 9/1998 | Maloney |
| 5,910,776 A | 6/1999 | Black |
| 5,920,261 A | 7/1999 | Hughes et al. |
| 5,936,134 A | 8/1999 | Mastral Lamarca et al. |
| 5,936,527 A | 8/1999 | Isaacman et al. |
| 5,942,978 A | 8/1999 | Shafer |
| 5,963,134 A | 10/1999 | Bowers et al. |
| 5,995,046 A | 11/1999 | Belcher et al. |
| 6,025,780 A | 2/2000 | Bowers et al. |
| 6,057,756 A | 5/2000 | Engellenner |
| RE36,791 E | 7/2000 | Heller |
| 6,084,530 A | 7/2000 | Pidwerbetsky et al. |
| 6,097,301 A | 8/2000 | Tuttle |
| 6,104,295 A | 8/2000 | Gaisser et al. |
| 6,104,311 A | 8/2000 | Lastinger |
| 6,121,878 A | 9/2000 | Brady et al. |
| 6,127,928 A | 10/2000 | Issacman et al. |
| 6,128,549 A | 10/2000 | Swartz et al. |
| 6,138,058 A | 10/2000 | Van Antwerp, Jr. et al. |
| 6,140,941 A | 10/2000 | Dwyer et al. |
| 6,150,921 A | 11/2000 | Werb et al. |
| 6,154,139 A | 11/2000 | Heller |
| 6,195,006 B1 | 2/2001 | Bowers et al. |
| 6,204,764 B1 | 3/2001 | Maloney |
| 6,232,870 B1 | 5/2001 | Garber et al. |
| 6,264,106 B1 | 7/2001 | Bridgelall |
| 6,305,607 B1 | 10/2001 | Katz et al. |
| 6,330,971 B1 | 12/2001 | Mabry et al. |
| 6,333,690 B1 | 12/2001 | Nelson et al. |
| RE37,531 E | 1/2002 | Chaco et al. |
| 6,335,686 B1 | 1/2002 | Goff et al. |
| 6,344,794 B1 | 2/2002 | Ulrich et al. |
| 6,351,215 B2 | 2/2002 | Rodgers et al. |
| 6,353,406 B1 | 3/2002 | Lanzl et al. |
| 6,356,197 B1 | 3/2002 | Patterson et al. |
| 6,356,230 B1 | 3/2002 | Greef et al. |
| 6,366,205 B1 | 4/2002 | Sutphen |
| 6,373,389 B1 | 4/2002 | Przygoda, Jr. et al. |
| 6,388,569 B1 | 5/2002 | Engellenner |
| 6,392,544 B1 | 5/2002 | Collins et al. |
| 6,396,413 B2 | 5/2002 | Hines et al. |
| 6,405,102 B1 | 6/2002 | Swartz et al. |
| 6,456,239 B1 | 9/2002 | Werb et al. |
| 6,459,726 B1 | 10/2002 | Ovard et al. |
| 6,472,976 B1 | 10/2002 | Wohl |
| 6,480,108 B2 | 11/2002 | McDonald |
| 6,483,427 B1 | 11/2002 | Werb |
| 6,486,780 B1 | 11/2002 | Garber et al. |
| 6,509,829 B1 | 1/2003 | Tuttle |
| 6,512,455 B2 | 1/2003 | Finn et al. |
| 6,531,963 B1 | 3/2003 | Nyfelt |
| 6,563,423 B2 | 5/2003 | Smith |
| 6,577,238 B1 | 6/2003 | Whitesmith et al. |
| 6,600,418 B2 | 7/2003 | Francis et al. |
| 6,611,556 B1 | 8/2003 | Koerner et al. |
| 6,614,350 B1 | 9/2003 | Lunsford et al. |
| 6,621,417 B2 | 9/2003 | Duncan et al. |
| 6,646,550 B1 | 11/2003 | Runyon et al. |
| 6,662,068 B1 | 12/2003 | Ghaffari |
| 6,681,990 B2 | 1/2004 | Vogler et al. |
| 6,687,609 B2 | 2/2004 | Hsiao et al. |
| 6,700,493 B1 | 3/2004 | Robinson |
| 6,700,533 B1 | 3/2004 | Werb et al. |
| 6,714,121 B1 | 3/2004 | Moore |
| 6,717,516 B2 | 4/2004 | Bridgelall |
| 6,717,517 B2 | 4/2004 | Przygoda, Jr. |
| 6,724,308 B2 | 4/2004 | Nicholson |
| 6,734,797 B2 | 5/2004 | Shanks et al. |
| 6,735,630 B1 | 5/2004 | Gelvin et al. |
| 6,744,366 B2 | 6/2004 | How |
| 6,747,560 B2 | 6/2004 | Stevens, III |
| 6,761,316 B2 | 7/2004 | Bridgelall et al. |
| 6,774,782 B2 | 8/2004 | Runyon et al. |
| 6,774,800 B2 | 8/2004 | Friedman et al. |
| 6,784,813 B2 | 8/2004 | Shanks et al. |
| 6,812,824 B1 | 11/2004 | Goldinger et al. |
| 6,814,293 B2 | 11/2004 | Curry et al. |
| 6,825,766 B2 | 11/2004 | Hewitt et al. |
| 6,834,800 B2 | 12/2004 | Okamura |
| 6,837,427 B2 | 1/2005 | Overhultz et al. |
| 6,876,295 B1 | 4/2005 | Lewis |
| 6,879,257 B2 | 4/2005 | Hisano et al. |
| 6,882,315 B2 | 4/2005 | Richley et al. |
| 6,883,710 B2 | 4/2005 | Chung |
| 6,888,459 B2 | 5/2005 | Stilp |
| 6,891,469 B2 | 5/2005 | Engellenner |
| 6,933,849 B2 | 8/2005 | Sawyer |
| 6,946,950 B1 * | 9/2005 | Ueno et al. .................. 340/10.1 |
| 6,956,509 B2 | 10/2005 | Shanks et al. |
| 6,956,538 B2 | 10/2005 | Moore |
| 6,980,100 B1 | 12/2005 | Hammond |
| 6,989,750 B2 | 1/2006 | Shanks et al. |
| 7,005,968 B1 | 2/2006 | Bridgelall |
| 7,009,496 B2 | 3/2006 | Arneson et al. |
| 7,019,663 B2 | 3/2006 | Sharony |
| 7,030,732 B2 | 4/2006 | Tuttle |
| 7,030,811 B2 | 4/2006 | Goren et al. |
| 7,034,683 B2 | 4/2006 | Ghazarian |
| 7,035,818 B1 | 4/2006 | Bandy et al. |
| 7,036,729 B2 | 5/2006 | Chung |
| 7,042,360 B2 | 5/2006 | Light et al. |
| 7,049,963 B2 | 5/2006 | Waterhouse et al. |
| 7,057,511 B2 | 6/2006 | Shanks et al. |

(56) References Cited

U.S. PATENT DOCUMENTS

| | | |
|---|---|---|
| 7,064,740 B2 | 6/2006 | Daly |
| 7,068,148 B2 | 6/2006 | Shanks et al. |
| 7,069,025 B2 | 6/2006 | Goren et al. |
| 7,075,436 B2 | 7/2006 | Shanks et al. |
| 7,075,437 B2 | 7/2006 | Bridgelall et al. |
| 7,076,442 B2 | 7/2006 | Lin et al. |
| 7,084,740 B2 | 8/2006 | Bridgelall |
| 7,084,769 B2 | 8/2006 | Bauer et al. |
| 7,102,523 B2 | 9/2006 | Shanks et al. |
| 7,106,175 B2 | 9/2006 | Lewis |
| 7,113,095 B2 | 9/2006 | Kuzma et al. |
| 7,116,228 B1 | 10/2006 | Singleton |
| 7,119,738 B2 | 10/2006 | Bridgelall et al. |
| 7,120,560 B2 | 10/2006 | Williams et al. |
| 7,142,120 B2 | 11/2006 | Charych et al. |
| 7,145,482 B2 | 12/2006 | Shanks et al. |
| 7,148,803 B2 | 12/2006 | Bandy et al. |
| 7,155,405 B2 | 12/2006 | Petrovich |
| 7,164,929 B2 | 1/2007 | Sharony |
| 7,167,717 B1 | 1/2007 | Goren |
| 7,170,412 B2 | 1/2007 | Knox et al. |
| 7,173,529 B2 | 2/2007 | Przygoda, Jr. |
| 7,195,159 B2 | 3/2007 | Sloan et al. |
| 7,199,716 B2 | 4/2007 | Shanks et al. |
| 7,215,976 B2 | 5/2007 | Brideglall |
| 7,228,136 B2 | 6/2007 | Myllymaki et al. |
| 7,242,306 B2 | 7/2007 | Wildman et al. |
| 7,248,933 B2 | 7/2007 | Wildman |
| 7,250,865 B2 | 7/2007 | Maloney |
| 7,253,717 B2 | 8/2007 | Armstrong et al. |
| 7,256,682 B2 | 8/2007 | Sweeney, II |
| 7,258,276 B2 | 8/2007 | Linton et al. |
| 7,260,553 B2 | 8/2007 | Ebert |
| 7,374,096 B2 | 5/2008 | Overhultz et al. |
| 7,411,921 B2 | 8/2008 | Strong et al. |
| 7,439,859 B2 | 10/2008 | Humphrey |
| 7,487,538 B2 | 2/2009 | Mok |
| 7,527,198 B2 | 5/2009 | Salim et al. |
| 7,551,089 B2 | 6/2009 | Sawyer |
| 7,617,850 B1 | 11/2009 | Dorney |
| RE41,531 E | 8/2010 | Wood, Jr. |
| 7,834,765 B2 | 11/2010 | Sawyer |
| 7,834,766 B2 | 11/2010 | Sawyer |
| 7,845,375 B2 | 12/2010 | Dorney |
| 7,848,905 B2 | 12/2010 | Troxler et al. |
| 7,933,945 B2 | 4/2011 | Krzyzanowski et al. |
| 7,965,190 B2 | 6/2011 | Maloney |
| 2001/0011954 A1 | 8/2001 | Shelton et al. |
| 2001/0038332 A1 | 11/2001 | Rodgers et al. |
| 2001/0040512 A1 | 11/2001 | Hines et al. |
| 2001/0040513 A1 | 11/2001 | McDonald |
| 2001/0051905 A1 | 12/2001 | Lucas |
| 2002/0008621 A1 | 1/2002 | Barritz et al. |
| 2002/0014234 A1 | 2/2002 | McCarren |
| 2002/0032435 A1 | 3/2002 | Levin |
| 2002/0033757 A1 | 3/2002 | Rodgers et al. |
| 2002/0041234 A1 | 4/2002 | Kuzma et al. |
| 2002/0057208 A1 | 5/2002 | Lin et al. |
| 2002/0063622 A1 | 5/2002 | Armstrong et al. |
| 2002/0063627 A1 | 5/2002 | Makiyama et al. |
| 2002/0070862 A1 | 6/2002 | Francis et al. |
| 2002/0075152 A1 | 6/2002 | Nysen |
| 2002/0147650 A1 | 10/2002 | Kaufman et al. |
| 2002/0152044 A1 | 10/2002 | Shanks et al. |
| 2002/0180588 A1 | 12/2002 | Erickson et al. |
| 2002/0196126 A1 | 12/2002 | Eisenberg et al. |
| 2003/0001739 A1 | 1/2003 | Clucas et al. |
| 2003/0007473 A1 | 1/2003 | Strong et al. |
| 2003/0013146 A1 | 1/2003 | Werb |
| 2003/0016122 A1 | 1/2003 | Petrick |
| 2003/0154114 A1 | 8/2003 | Lucarelli |
| 2003/0174099 A1 | 9/2003 | Bauer et al. |
| 2003/0216969 A1 | 11/2003 | Bauer et al. |
| 2004/0111338 A1 | 6/2004 | Bandy et al. |
| 2004/0257231 A1 | 12/2004 | Grunes et al. |
| 2005/0027604 A1 | 2/2005 | Bandy et al. |
| 2006/0061474 A1 | 3/2006 | Shanks et al. |
| 2006/0065731 A1 | 3/2006 | Powell et al. |
| 2006/0119471 A1 | 6/2006 | Rudolph et al. |
| 2006/0170534 A1 | 8/2006 | Arneson et al. |
| 2006/0282459 A1 | 12/2006 | Kabala |
| 2007/0194933 A1 | 8/2007 | Shanks et al. |
| 2009/0030605 A1 | 1/2009 | Breed |

FOREIGN PATENT DOCUMENTS

| | | |
|---|---|---|
| EP | 1239634 A2 | 9/2002 |
| EP | 1320062 A2 | 6/2003 |
| GB | 2277850 A | 11/1994 |
| WO | WO-00/46771 A1 | 8/2000 |
| WO | WO-00/52498 A1 | 9/2000 |
| WO | WO-00/68907 A1 | 11/2000 |
| WO | WO-01/06401 A1 | 1/2001 |
| WO | WO-01/15070 A2 | 3/2001 |
| WO | WO-01/29574 A2 | 4/2001 |
| WO | WO-01/57762 A1 | 8/2001 |
| WO | WO-01/61833 A1 | 8/2001 |
| WO | WO-02/067006 A2 | 8/2002 |
| WO | WO-02/088776 A2 | 11/2002 |
| WO | WO-2004/036482 A2 | 4/2004 |
| WO | WO-2004036771 A2 | 4/2004 |
| WO | WO-2004/038644 A2 | 5/2004 |
| WO | WO-2004092999 A2 | 10/2004 |
| WO | WO-2005022454 A1 | 3/2005 |
| WO | WO-2005066878 A1 | 7/2005 |

OTHER PUBLICATIONS

Office Action mailed Feb. 10, 2012 in reexamination U.S. Appl. No. 90/011,954.

Office Action mailed Feb. 27, 2012 in reexamination U.S. Appl. No. 90/011,939.

R. J. Puerzer, "The Development of a Patient Tracking and Control System for Use in the Emergency Department" 1997, 170 pages.

J. Landt, "Shrouds of Time: The history of RFID." AIM Production, Oct. 1, 2001, 11 pages.

D. L. Brock, "Smart Medicine: The Application of Auto-ID Technology to Healthcare," Feb. 1, 2002, 39 pages.

S. McNichols, "Keeping Your Assets Safe. (Technologies: Asset Tracking)." Feb. 1, 2002, pp. 26-27.

Business Wire, "Automated Identification Technologies Long Range Wireless ID Tags and Powerful New Capabilities to Cybermotion's Automated Patrol Systems," Dec. 14, 2000, 3 pages.

B. W. Martin, "WatchIt: A Fully Supervised Identification, Location and Tracking System," 1995, IEEE, pp. 306-310.

M. Youssef et al., "PinPoint: An Asynchronous Time-Based Location Determination System," Jun. 19-22, 2006, pp. 165-176.

"Claim Construction of the Patents-In-Suit," *Automated Tracking Solutions, LLC v. Awarepoint Corporation et al.*, U.S. District Court for the Eastern District of Virginia, Case: 1:12cv-01313-CMH-TCB, Jun. 25, 2013, 10 pages.

Fox et al., "A Probablistic Approcah to Collaborative Multi-Robot Localization," Autonomous Robots, 8(3), 2000, 25 pages.

"Matrics AR400 Reader User's Manual," Jun. 21, 2004, 77 pages.

"Matrics API Programmer's Manual," Sep. 14, 2004, 77 pages.

A. Harter et al.. "A Distributed Location System for the Active Office," Nov. 1993, pp. 1-7.

D. Estrin et al., "Next Century Challenges Scalable Coordination in Sensor Networks," 1999, pp. 263-270.

N. Priyantha et al., "The Cricket Location-Support System," Aug. 2000, 12 pages.

A. Rowstron et al., "Pastry: Scalable, decentralized object location and routing for large-scale peer-to-peer systems," Nov. 2001, 22 pages.

N. B. Priyantha "Providing Precise Indoor Location Information to Mobile Devices," Jan. 2001, 54 pages.

J. Patten et al. "Sensetable: A Wireless Object Tracking Platform for Tangible User Interfaces," Mar. 31, 2001-Apr. 5, 2001, 8 pages.

"TouchPath: The Low Cost Data Path for Touch Memory." Jul. 14, 1993, 41 pages.

(56) References Cited

OTHER PUBLICATIONS

D. Brock, "Intelligent Objects: Infrastructure for Networking Physical Systems," Laboratory for Manufacturing and Productivity, Feb. 1, 2002, 39 pages.
"Smart World: A Preview of The Next Wave of Internet and eCommerce Applications," MIT Inductrial Liaison Program and The Auto-ID Center at MIT, Apr. 2000, pp. 1-50.
R. Elmasri et al., "Fundamentals of Database Systems," 6th Edition, 2011, 1201 pages.
Sovereign Tracking Systems LLC, "Applications," Apr. 15, 2001, 1 page.
Sovereign Tracking Systems LLC, "Asset Tracking Systems," Jun. 10, 2000, 4 pages.
Sovereign Tracking Systems LLC, "The PalTrack System," Apr. 26, 2001, 2 pages.
Sovereign Tracking Systems LLC, "Sovereign Presentation," Feb. 18, 2001, 1 page.
Sovereign Tracking Systems LLC, "Single Access Monitor," Feb. 20. 2001, 2 pages.
Declaration of William A. Robinson, Sovereign Real-Time Location System, Veterans Affairs Medical Center, 1999, 75 pages.
Want et al., "The Active Badge Location System," Jan. 1992, 7 pages.
S. R. Bible et al., "Using Spread-Spectrum Ranging Techniques for Position Tracking in a Virtual Environment," 1995, pp. 1-15.
Y.-B. Ko et al., "Location-Aided Routing (LAR) in Mobile Ad Hoc Networks," 2000, 10 pages.
U. Leonhardt et al., "Multi-Sensor Location Tracking," 1998, 12 pages.
S. Volz et al, "Nexus: The Development of a Platform for Location Aware Applications," 1999, pp. 1-10.
J. Smith et al., "Location Based Services—The Underlying Technology," 2003, 15 pages.
P. Bahl et al., RADAR: An In-Building RF-based User Location and Tracking System, 2000, pp. 1-11.
B. Brumitt et al., "Ubiquitous Computing & The Role of Geometry," 2000. 4 pages.
A. Savvides et al., "Dynamic Fine-Grained Localization in Ad-Hoc Networks of Sensors," 2001, 14 pages.
"Scanner Specification Version S416," SCS Corporation, Apr. 29, 2001, 2 pages.
P. Bahl, "A Software System for Locating Mobile Users: Design, Evaluation, and Lessons," 2000, pp. 1-13.
J. Smith et al., "Assessing Spatial Data Infrastructure Architecture for Integration with; Wireless Location Services," Feb. 2003, 14 pages.
N. Belusu et al., "GPS-less Low Cost Outdoor Localization for Very Small Devices," 2000, pp. 1-7.
"SCS—Scanner Version S516," SCS Corporation, Apr. 29, 2001, 2 pages.
Deposition Transcript of William Robinson, District Court litigation styled *Automated Tracking Solution, LLC* v. *Teletracking Technologies, Inc and Radarfind Corporation*, United States District Court for the Eastern District of Virginia, Alexandria Division, Case No. 1:12-cv-1304-GBL-IDD, Jun. 5, 2013, 1 page.

* cited by examiner

METHOD AND APPARATUS FOR TRACKING OBJECTS AND PEOPLE

RELATED APPLICATIONS

This application is a continuation of U.S. patent application Ser. No. 13/453,517 filed Apr. 23, 2012, which is a continuation of U.S. Pat. No. 8,279,069, filed Oct. 11, 2010, which is a Continuation of U.S. Pat. No. 7,834,766, filed Apr. 3, 2009, which is a continuation of U.S. Pat. No. 7,551,089, filed Jul. 21, 2003, which is a Continuation-in-Part of U.S. Pat. No. 6,933,849 non-Provisional Application Ser. No. 10/458,690, tiled Jun. 11, 2003, which claims benefit of priority of Provisional Application Ser. No. 60/394,263. filed Jul. 9, 2002. The respective disclosures of all of these are incorporated herein by reference in their entirety.

BACKGROUND OF INVENTION a. Field of Invention

The invention, generally designated the Assets Locating. Tracking and Surveillance System (ACES), relates generally to object or asset locating, tracking, and surveillance, and, more particularly to a method and apparatus for locating, identifying, tracking, and surveillance of physical objects and evidence in environments such as police departments, law offices, and the Courts.

b. Description of Related Art

It is often necessary to locate and track objects in a timely and efficient manner. Many individuals place a premium on productivity and on minimizing wasted time by facilitating the identification, locating and tracking of objects of interest. This is especially true for the legal system, which often has problems managing physical evidence at various levels of the system. These levels include, for example, the crime scene itself, storage facilities and procedures at police headquarters, the office of the prosecutor, the defense, the Courts, and archival locations. The systems in use today for handling physical evidence range from honor systems and hand-written entries in logs to the more sophisticated bar code systems similar to those used by the New York City Police Department. It has been determined herein through interviews with senior officials of several police departments that the problems associated with locating and tracking evidence are significant. Police officials cite instances where police officers have kept critical evidence in police cars or in their homes for weeks, and sometimes several months. Officials cite many cases of lost evidence that could actually exist somewhere in the systems today. Many instances of evidence tampering and stolen evidence involving narcotics, money and other captured items are also prevalent. Lastly, officials also cite cases that they consider "inside jobs" and emphasize the need to reduce human responsibility in locating, tracking, and surveillance of physical evidence.

In a specific case involving the Oklahoma City bombing, a former US Deputy Attorney General stated that the prosecutor's team could have used an automatic locating and tracking system for managing the vast array of physical evidence during this high profile case. The probe of Timothy McVeigh and the bombing was a complicated operation resulting in Reports, photographs, tapes, letters, and other physical objects that numbered in the millions. Three major sites were involved in managing the evidence: Washington, D.C., Denver, Colo., and Oklahoma City. Late in the McVeigh trial, the sudden discovery of nearly 3,100 pieces of physical evidence in Oklahoma City almost jeopardized the case against the conspirators. This type of discovery clearly brings into light the need for an automatic locating and tracking system for managing evidence.

In more recent development, a new law called "The Innocence Protection Act" is being enacted in Washington, D.C. and other areas of the country, and requires law enforcement to maintain certain documents and violent crime evidence that may later be subjected to DNA testing. Under the Innocence Protection Act, storage of documents and evidence may last as long as 60 to 70 years. Since convicts will most likely test the Government's compliance with this law at the 10, 15, 20, or 30-year marks, the new law has implications in that law enforcement will need better ways of tracking evidence during the collection and litigation processes. Law enforcement will also need better ways of locating, tracking and retrieving evidence years later.

Since current systems for tracking objects are inadequate for managing physical evidence and valued physical assets of the types discussed above, there remains a need for a method and apparatus for locating, identifying, tracking, and surveillance of physical objects and evidence in environments such as police departments, law offices, and the Courts. Specifically, there remains a need for a method and apparatus for locating, identifying, tracking, and surveillance of physical objects and evidence, which is economically feasible to manufacture, install and service, which is robust in design and which may be configured as needed for a desired aesthetic appearance.

SUMMARY OF INVENTION

The invention solves the problems and overcomes the drawbacks and deficiencies of prior art systems for tracking objects by providing a method and apparatus for locating, identifying, tracking, and surveillance of physical objects and evidence.

Thus, an exemplary aspect of the present invention is to provide a method and apparatus for locating, identifying, tracking, and surveillance of physical objects and evidence, which is economically feasible to manufacture, install and service, which is robust in design and which may be configured as needed for a desired aesthetic appearance.

Another aspect of the present invention is to provide a method and apparatus which is simple to operate, yet provides users with the flexibility of describing and analyzing objects and related aspects thereof in sufficient detail.

Yet other aspects of the present invention are to provide a method and apparatus which is usable in a variety of environments, easily modifiable, secure, efficient in operation and user-friendly.

The present invention achieves the aforementioned exemplary aspects by employing radio frequency identification (RFID) technology, computer programming and database applications, networking technologies, and hardware elements for locating, identifying, tracking, and surveillance of objects. Alternatively, the present invention may employ laser and/or infrared technology, computer programming and database applications, networking technologies, and hardware elements for locating, identifying, tracking, and surveillance of objects. The Assets Locating, Tracking and Surveillance System (ALTSS) of the present invention may provide one or multiple users the ability to perform a wide variety of standard and user-defined locating, tracking, and administrative functions. ALTSS may be used to locate and track merchandise. physical evidence, information carriers like files, folders or individual pieces of paper, and people, under certain conditions, in near-real time. It may be configured as part of a local area network, a wide area network, or the Internet. ALTSS may also be utilized by users who are interested in finding physical objects in a timely manner. Those skilled in the art would appreciate in view of this disclosure that other than physical evidence, the method and apparatus according to the present invention may be employed for locating, identifying, tracking, and surveillance of a wide variety of objects in environments such as warehouses, offices, department stores, etc.

The RFID technology employed by the present invention is a rapidly developing technology. A great deal of explanatory material is available from RFID product manufacturers such as Microchip, SCS, Intermec, and Texas Instruments. Specifically, RFID is a means of storing and retrieving data through electromagnetic transmission to a radio frequency compatible integrated circuit. A simple RFID system may be composed of three components: a scanner, a transponder, and a computer. The transponder may be composed of an antenna coil and silicon chips. The transponder may be an active or passive design depending on whether it contains a power source. The transponder may contain identifying information in its memory. A passive transponder may be energized by a time-varying electromagnetic radio frequency (RF) wave that may be transmitted by the scanner. When the RF field passes through the antenna coil, an AC voltage may be generated across the coil. This voltage may be rectified to supply power to the transponder. The information stored in the transponder may then be transmitted back to the scanner by a process called backscattering. Some transponders may include a "write" capability in that information such as a legal case number or case name may be placed in memory. The read range or distance between the transponder and the antenna of the scanner may vary from a few inches to approximately 25 feet. Transponders having their own power source can generate a read range beyond 25 feet. Scanners and transponders operate in the Very high frequency (VI-IF). Ultra high frequency (UHF), and low gigahertz bands, and many scanner transponder combinations have FCC Part 15 Certifications.

In the case of physical evidence, a user may attach a passive transponder having a compact form factor to an item or box of evidence. The user may then input data into ALTSS via a database form and network browser, thus associating the transponder with a piece of evidence. The user may place the evidence into the system by placing it in an ALTSS container, which may be an oversized cabinet having the look of a large office file cabinet, or another area covered by the system. In an exemplary embodiment of the present invention, the drawers may be over six feet in depth and roll outward similar to the drawers of containers in a morgue. The containers may be built to handle the antennas and cables that are attached to the scanners. The antennas, which may be placed in the cabinets, may be small with a read range of 18 to 20 inches. The antennas may be circularly polarized and the transponders may be read in virtually any orientation to the antennas. Similar to radar operations, the antennas at the top of the drawers may divide the area of each drawer into sectors. Precise location of the evidence may depend on the characteristics and placement of the antennas. A transponder attached to evidence and moved into an antenna's field of view may be detected by the system. Data may be transmitted to the main computer and the system's back-end processing may then initiate. This processing may update the tracking tables for the evidence in the database. Antennas in the ceiling and doorways of an evidence storage facility may detect and track transponders attached to objects or people. The system's scanners may be connected to a local area network. Any number of users who have access privileges (i.e. on a need-to-know basis) and who are connected to the network may access ALTSS to locate and track evidence or objects. Remote authorized access to ALTSS in organizations in other cities may also be possible through a connection to the Internet.

Specifically, the invention provides a system for locating, identifying and tracking of at least one object or person. The system may include an active or passive transponder affixable to the object or person, a scanner for transmitting and receiving time-varying electromagnetic radio frequency (RF) signals, and an antenna for respectively transmitting and receiving the RF signals to and from the scanner and the transponder. The antenna may be strategically affixable within a facility for enabling the system to process data generated by the transponder, scanner and antenna to locate, identify and track the object or person having the transponder affixed to the object or person. The system may be configured such that the locating determines a position of the object or person, the identifying determines a characteristic by which the object or person is recognizable, and the tracking monitors the course of a moving object or person.

For the system described above, the system may further include a plurality of Transponders, scanners and antennas. The system may also include at least one application server for processing the data and being logically connectable to the scanner, at least one user terminal and workstation for inputting the data into the system, and at least one database server for managing and storing the data in an enterprise database. The system may include at least one server for processing, managing and storing the data and being logically connectable to the scanner. The system may also include at least one network operatively connecting the scanner. workstation, application server and user terminal for thereby transmitting the data and providing access to the Internet. The network may be an enterprise network. The antenna may be affixed at an entrance of the facility, an exit of the facility, a wall of the facility, a ceiling of the facility and/or furniture within the facility.

For the system described above, the system may include a computer program for interrupting at least one of the scanners, and polling the interrupted scanner to determine whether the scanner is an entrance/exit scanner, a scanner affixed on a ceiling or wall of the facility, thereby designated a wall scanner, and/or a scanner for locating and tracking objects within a storage unit within the facility, thereby designated a unit scanner. If the scanner is an entrance/exit scanner and detects a transponder ID, the computer program may include code for comparing known transponder IDs with the detected transponder ID, if one of the known transponder IDs does not correspond to the detected transponder ID, then recording the detected transponder ID and/or indicating the detected transponder ID as being unknown, and if one of the known transponder IDs corresponds to one of the detected transponder IDs, then recording the detected transponder ID and/or indicating the detected transponder ID as entering or exiting the facility. If the scanner is a wall scanner and detects a transponder ID, the computer program may include code for comparing known transponder IDs with the detected transponder ID, if one of the known transponder IDs does not correspond to the detected transponder ID, then recording movement of the detected transponder ID and/or indicating the detected transponder ID as being unknown, and if one of the known transponder IDs corresponds to one of the detected transponder IDs, then recording the detected transponder ID and/or recording movement of the detected transponder ID.

For the system described above, for each unit scanner, the computer program may include code for determining a number of active antennas operationally connected to the unit scanner, cycling through the active antennas and listing all corresponding transponder IDs for transponders in a field of view of the active antennas, reporting the transponder IDs found by each active antenna, and after all unit scanners have been evaluated, comparing a number of the reported transponder IDs with a number of all transponder IDs for transponders known to be in the storage unit. If the number of all transponder IDs known to be in the storage unit is greater than the number of reported transponder IDs, the computer program may include code for comparing each of the transponder IDs known to be in the storage unit with each of the reported transponder IDs, if one of the transponder IDs known to be in the storage unit does not correspond to each of the reported transponder IDs, then designating the one known transponder ID as a missing transponder ID, and/or indicating the object having the missing transponder ID as being removed from the system, and if one of the transponder IDs known to be in the storage unit corresponds to one of the reported transponder IDs, then recording a location of the object relative to the field of view of the corresponding active antenna. If the number of all transponder IDs known to be in the storage unit is equal to the number of reported transponder IDs, the computer program may include code for comparing each of the transponder IDs known to be in the storage unit with each of the reported transponder IDs, if one of the reported transponder IDs does not correspond to one of the transponder IDs known to be in the storage unit, then recording a location of said reported transponder ID, designating the one reported transponder ID as an unknown transponder ID, and/or indicating the object having the unknown transponder ID as being unknown and new to the system, and if one of the transponder IDs known to be in the storage unit corresponds to one of the reported transponder IDs, then recording a location of the object relative to the field of view of the corresponding active antenna. If the number of all transponder IDs known to be in the storage unit is less than the number of reported transponder IDs, the computer program may include code for comparing each of the reported transponder IDs with each of the transponder IDs known to be in the storage unit, if one of the reported transponder IDs does not correspond to each of the transponder IDs known to be in the storage unit, then recording a location of said reported transponder ID, designating the one reported transponder ID as an unknown transponder ID, and/or indicating the object having the unknown transponder ID as being at least one of unknown and new to the system, and if one of the reported transponder IDs corresponds to one of the transponder Ills known to be in the storage unit, then recording a location of the object relative to the field of view of the corresponding active antenna.

The system may further include means for interrupting at least one of the scanners, and polling the interrupted scanner to determine whether the scanner is an entrance/exit scanner, a scanner affixed on a ceiling or wall of the facility, thereby designated a wall scanner, and/or a scanner for locating and tracking objects within a storage unit within the facility, thereby designated a unit scanner. If the scanner is an entrance/exit scanner and detects a transponder ID, the system may further include means for comparing known transponder IDs with the detected transponder ID, if one of the known transponder IDs does not correspond to the detected transponder ID, then recording the detected transponder ID and/or indicating the detected transponder ID as being unknown, and if one of the known transponder IDs corresponds to one of the detected transponder IDs, then recording the detected transponder ID and/or indicating the detected transponder ID as entering or exiting the facility. If the scanner is a wall scanner and detects a transponder ID, the system may further include means for comparing known transponder IDs with the detected transponder ID, if one of the known transponder IDs does not correspond to the detected transponder ID, then recording movement of the detected transponder ID and/or indicating the detected transponder ID as being unknown, and if one of the known transponder IDs corresponds to one of the detected transponder IDs, then recording the detected transponder ID and/or recording movement of the detected transponder ID.

For each unit scanner, the system may further include means for determining a number of active antennas operationally connected to the unit scanner, cycling through the active antennas and listing all corresponding transponder IDs for transponders in a field of view of the active antennas, reporting the transponder IDs found by each active antenna, and/or after all unit scanners have been evaluated, comparing a number of the reported transponder IDs with a number of all transponder IDs for transponders known to be in the storage unit. If the number of all transponder IDs known to be in the storage unit is greater than the number of reported transponder IDs, the system may further include means for comparing each of the transponder IDs known to be in the storage unit with each of the reported transponder IDs, if one of the transponder IDs known to be in the storage unit does not correspond to each of the reported transponder IDs, then designating the one known transponder ID as a missing transponder ID, and/or indicating the object having the missing transponder ID as being removed from the system, and if one of the transponder IDs known to be in the storage unit corresponds to one of the reported transponder IDs, then recording a location of the object relative to the field of view of the corresponding active antenna. If the number of all transponder IDs known to be in the storage unit is equal to the number of reported transponder IDs, the system may further include means for comparing each of the transponder IDs known to be in the storage unit with each of the reported transponder IDs, if one of the reported transponder IDs does not correspond to one of the transponder IDs known to be in the storage unit, then recording a location of said reported transponder ID, designating the one reported transponder ID as an unknown transponder ID, and/or indicating the object having the unknown transponder ID as being unknown and new to the system, and if one of the transponder IDs known to be in the storage unit corresponds to one of the reported transponder IDs, then recording a location of the object relative to the field of view of the corresponding active antenna. If the number of all transponder IDs known to be in the storage unit is less than the number of reported transponder IDs, the system may further include means for comparing each of the reported transponder IDs with each of the transponder IDs known to be in the storage unit, if one of the reported transponder IDs does not correspond to each of the transponder IDs known to be in the storage unit, then recording a location of said reported transponder ID, designating the one reported transponder ID as an unknown transponder ID, and/or indicating the object having the unknown transponder ID as being at least one of unknown and new to the system, and if one of the reported transponder IDs corresponds to one of the transponder IDs known to be in the storage unit, then recording a location of the object relative to the field of view of the corresponding active antenna. The system may also be operable via the Internet.

For the system described above, the scanner may include a computer program and/or means for handling deterministic or stochastic polling requests to include stochastic polling requests generated by the scanner itself based on a random event, such as a new transponder entering one of the antenna's field of view. The system may also include a computer program and/or means for receiving and processing polling requests from the scanner based on event data, and polling the scanner reporting the event data.

The invention also provides a system for locating, identifying and tracking of at least one object or person. The system may include an active or passive transponder affixable to the object or person, a scanner for transmitting and receiving a laser and/or an infrared signal, and an antenna for respectively transmitting and receiving the laser and/or infrared signals to and from the scanner and the transponder. The antenna may be strategically affixable within a facility for enabling the system to process data generated by the transponder, scanner and antenna to locate, identify and track the object or person having the transponder affixed to the object or person, and the system being configured such that the locating determines a position of the object or person, the identifying determines a characteristic by which the object or person is recognizable and the tracking monitors the course of a moving object or person.

The invention vet further provides a method of locating, identifying and tracking of at least one object or person by means of a system. The method may include affixing an active or passive transponder to the object or person, providing a scanner, providing an antenna, if the transponder is passive, transmitting a time-varying electromagnetic radio frequency (RF) signal by means of the scanner, energizing the transponder by the RF signal, and transmitting information stored in the transponder back to the scanner. If the transponder is active, automatically transmitting the information stored in the transponder back to the scanner, processing the transmitted information to enable locating, identifying and tracking of the object or person, and/or configuring the system such that the locating determines a position of the object or person, the identifying determines a characteristic by which the object or person is recognizable and the tracking monitors the course of a moving object or person.

For the method described above, the method may further include providing a plurality of transponders, scanners and antennas. The method may also include interrupting at least one of the scanners, and polling the interrupted scanner to determine whether the scanner is an entrance/exit scanner, a scanner affixed on a ceiling or wall of a facility, thereby designated a wall scanner, and/or a scanner for locating and tracking objects within a storage unit within the facility, thereby designated a unit scanner. If the scanner is an entrance/exit scanner and detects a transponder ID, the method may further include comparing known transponder IDs with the detected transponder ID, if one of the known transponder IDs does not correspond to the detected transponder ID, then recording the detected transponder ID and/or indicating the detected transponder ID as being unknown, and if one of the known transponder IDs corresponds to one of the detected transponder IDs, then recording the detected transponder ID and/or indicating the detected transponder ID as entering or exiting the facility. If the scanner is a wall scanner and detects a transponder ID, the method may further include comparing known transponder IDs with the detected transponder ID, if one of the known transponder IDs does not correspond to the detected transponder ID, then recording movement of the detected transponder ID and/or indicating the detected transponder ID as being unknown, and if one of the known transponder IDs corresponds to one of the detected transponder IDs, then recording the detected transponder ID and/or recording movement of the detected transponder ID. For each unit scanner, the method may further include determining a number of active antennas operationally connected to the unit scanner, cycling through the active antennas and listing all corresponding transponder IDs for transponders in a field of view of the active antennas, reporting the transponder IDs found by each active antenna, and/or after all unit scanners have been evaluated, comparing a number of the reported transponder IDs with a number of all transponder IDs for transponders known to be in the storage unit. If the number of all transponder IDs known to be in the storage unit is greater than the number of reported transponder IDs, the method may further include comparing each of the transponder IDs known to be in the storage unit with each of the reported transponder IDs, if one of the transponder IDs known to be in the storage unit does not correspond to each of the reported transponder IDs, then designating the one known transponder ID as a missing transponder ID, and/or indicating the object having the missing transponder ID as being removed from the system, and if one of the transponder IDs known to be in the storage unit corresponds to one of the reported transponder IDs, then recording a location of the object relative to the field of view of the corresponding active antenna. If the number of all transponder IDs known to be in the storage unit is equal to the number of reported transponder IDs, the method may further include comparing each of the transponder IDs known to be in the storage unit with each of the reported transponder IDs, if one of the reported transponder IDs does not correspond to one of the transponder IDs known to be in the storage unit, then recording a location of said reported transponder ID, designating the one reported transponder ID as an unknown transponder ID, and/or indicating the object having the unknown transponder ID as being unknown and new to the system, and if one of the transponder IDs known to be in the storage unit corresponds to one of the reported transponder IDs, then recording a location of the object relative to the field of view of the corresponding active antenna. If the number of all transponder IDs known to be in the storage unit is less than the number of reported transponder IDs, the method may further include comparing each of the reported transponder IDs with each of the transponder IDs known to be in the storage unit, if one of the reported transponder IDs does not correspond to each of the transponder IDs known to be in the storage unit, then recording a location of said reported transponder ID, designating the one reported transponder ID as an unknown transponder ID, and/or indicating the object having the unknown transponder ID as being at least one of unknown and new to the system, and if one of the reported transponder IDs corresponds to one of the transponder IDs known to be in the storage unit, then recording a location of the object relative to the field of view of the corresponding active antenna. For the method described above. the system may be operable via a network browser and/or the Internet.

For the system and method described above, a computer program or other means may be provided for polling at least one scanner to determine whether the scanner is an entrance/exit scanner, a scanner affixed on a ceiling or wall of the facility, thereby designated at wall scanner, and/or a scanner for locating and tracking objects within a storage unit within the facility, thereby designated a unit scanner.

The invention also provides a system for locating, identifying and tracking of at least one object or person. The system may include an active or passive transponder affixable to the object or person, a scanner for transmitting and receiving time-varying electromagnetic radio frequency (RF) signals, and/or an antenna for respectively transmitting and receiving the RF signals to and from the scanner and the transponder. The antenna may be strategically affixable within a facility, and the system may include locating, identifying and tracking means for enabling the system to process data generated by the transponder, scanner and antenna to locate, identify and track the object or person having the transponder affixed to the object or person, with the locating means enabling location of at position of the object or person, the identifying means enabling identification of a characteristic by which the object or person is recognizable and the tracking means enabling tracking of the course of a moving object or person.

For the system described above, the system may also include at least one application server for processing the data and being logically connectable to the scanner, at least one user terminal and workstation for inputting the data into the system, and at least one database server for managing and storing the data in an enterprise database. The antenna may be affixed at an entrance of the facility, an exit of the facility, at a wall of the facility, a ceiling of the facility, and/or furniture within the facility. The system may include a computer program for interrupting at least one of the scanners, and polling the interrupted scanner to determine whether the scanner is an entrance/exit scanner, a scanner affixed on a ceiling or wall of the facility, thereby designated a wall scanner, and/or scanner for locating and tracking objects within a storage unit within the facility, thereby designated a unit scanner. If the scanner is an entrance/exit scanner and detects a transponder ID, the computer program may include code for comparing known transponder IDs with the detected transponder ID, if one of the known transponder IDs does not correspond to the detected transponder ID, then recording the detected transponder II) and/or indicating the detected transponder ID as being unknown, and if one of the known transponder IDs corresponds to one of the detected transponder IDs, then recording the detected transponder ID and/or indicating the detected transponder ID as entering or exiting the facility. If the scanner is a wall scanner and detects a transponder ID, the computer program may include code for comparing known transponder IDs with the detected transponder ID, if one of the known transponder IDs does not correspond to the detected transponder ID, then recording movement of the detected transponder ID and/or indicating the detected transponder ID as being unknown, and if one of the known transponder IDs corresponds to one of the detected transponder IDs, then recording the detected transponder ID and/or recording movement of the detected transponder ID. For each unit scanner, the computer program may include code for determining a number of active antennas operationally connected to the unit scanner, cycling through the active antennas and listing all corresponding transponder IDs for transponders in a field of view of the active antennas, reporting the transponder IDs found by each active antenna, and after all unit scanners have been evaluated, comparing a number of the reported transponder IDs with a number of all transponder IDs for transponders known to be in the storage unit.

If the number of all transponder IDs known to be in the storage unit is greater than the number of reported transponder IDs, the computer program may include code for comparing each of the transponder IDs known to be in the storage unit with each of the reported transponder IDs, if one of the transponder IDs known to be in the storage unit does not correspond to each of the reported transponder IDs, then designating the one known transponder ID as a missing transponder ID, and/or indicating the object having the missing transponder ID as being removed from the system, and if one of the transponder IDs known to be in the storage unit corresponds to one of the reported transponder IDs, then recording a location of the object relative to the field of view of the corresponding active antenna. If the number of all transponder IDs known to be in the storage unit is equal to the number of reported transponder IDs, the computer program may include code for comparing each of the transponder IDs known to be in the storage unit with each of the reported transponder IDs, if one of the reported transponder IDs does not correspond to one of the transponder IDs known to be in the storage unit, then recording a location of said reported transponder ID, designating the one reported transponder ID as an unknown transponder ID, and/or indicating the object having the unknown transponder ID as being unknown and new to the system, and if one of the transponder IDs known to be in the storage unit corresponds to one of the reported transponder IDs, then recording a location of the object relative to the field of view of the corresponding active antenna.

If the number of all transponder IDs known to be in the storage unit is less than the number of reported transponder IDs, the computer program may include code for comparing each of the reported transponder IDs with each of the transponder IDs known to be in the storage unit, if one of the reported transponder IDs does not correspond to each of the transponder IDs known to be in the storage unit, then recording a location of said reported transponder ID, designating the one reported transponder ID as an unknown transponder ID, and/or indicating the object having the unknown transponder ID as being at least one of unknown and new to the system, and if one of the reported transponder IDs corresponds to one of the transponder IDs known to be in the storage unit, then recording a location of the object relative to the field of view of the corresponding active antenna.

The lexicon of key words for this application is as follows: Detecting—the act of determining the existence of an object in space and time; Identifying—the act of determining the characteristic or set of characteristics by which an object or thing (or person) is definitively recognizable or known; locating—the act of determining or specifying the position of an object or determining the place where something is or could be located; Tracking—the monitoring of the course of a moving object; Surveillance—the systematic observation of an assigned coverage region for the detection and tracking of objects or people. Further, surveillance includes the close, dedicated observation at all times of an object or person in one or more assigned coverage regions.

Additional features, advantages, and embodiments of the invention may be set forth or apparent from consideration of the following detailed description, drawings, and claims, Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings.

DETAILED DESCRIPTION OF THE PREFERRED EMBODIMENTS

Figure 1:
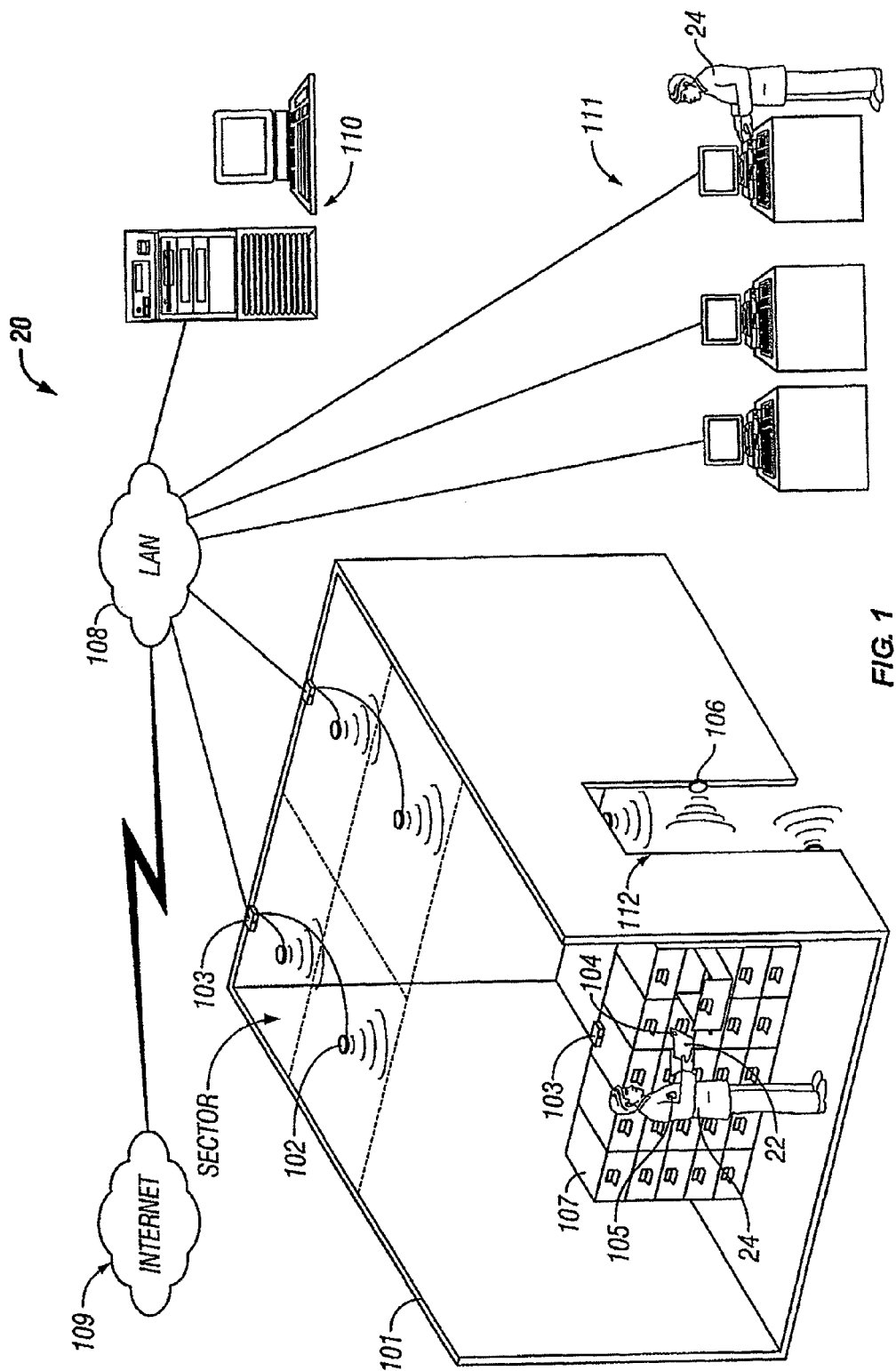
FIG. 1 is a diagram of the Assets Locating, Tracking and Surveillance System (ALTSS) according to the present invention, installed in a facility, for locating, identifying, tracking. and providing surveillance of objects and people, under certain conditions.

Referring now to the drawings wherein like reference numerals designate corresponding parts throughout the several views, FIGS. 1-19 illustrate an Assets Locating, Tracking, and Surveillance System (ALTSS), hereinafter referred to as "ALTSS" or "the system" according to the present invention, generally designated 20.

Referring to FIG. 1, ALTSS 20 for identifying, locating, tracking, and providing surveillance over physical evidence (also referred to as objects) 22 and people (also referred to as users) 24, is illustrated as being installed in an exemplary facility 101. Facility 101 may be divided into sectors in accordance with the radio frequency coverage (footprint) of antennas 102. which are located in the ceiling (not shown) thereof. Other antennas similar to antenna 102. may be positioned in the ceiling as needed to cover remaining sectors of facility 101. Those skilled in the art will appreciate in view of this disclosure that additional antennas (not shown) may be placed at various strategic locations, such as on top of furniture, at wall and/or ceiling corners etc. without departing from the scope of this invention. Antennas 102 may be connected to scanners 103. In an exemplary embodiment, the read range of antennas 102 and scanners 103 from the ceiling downward may be approximately 18 feet. A transponder 104 (being attached to an object) or 105 (being attached to a person) entering the field of view of a ceiling antenna 102 may be detected by scanner 103. One or more additional antennas 106 may cover the entrance and exit 112 of facility 101. In the exemplary embodiment of FIG. 1, antennas 106 may be configured to provide a read range of less than four feet, or the width of entrance 112. Accordingly, a transponder 104 or 105 entering the field of view of antennas 106 is detected by scanner 103. Any movement by transponder 104 or 105 about facility 101 may be thereby detected and recorded by ALTSS 20. As shown in greater detail in FIGS. 2-4, a container 107 may be equipped with small antennas 302 and a number of scanners 103 to locate, identify, and track transponder 104 and similar transponders that are attached to objects 22 placed inside container 107. It is apparent that several containers 107 or shelves may be used in facility 101 to store objects. As shown in FIG. 1, scanners 103 may be connected to a local area network 108 by hard-wiring or wireless connections, for example. Local-area network 108 may provide access to Internet 109. A data and application server 110 may be connected to network 108. Server 110 may perform all back-end processing for ALTSS 20. Front-end processing for ALTSS 20 may be performed at user terminals 111. Any number of user terminals 111 may be attached to local area network 108 and provide access to ALTSS 20. If granted access, a user at terminal 111 may use his/her network browser to determine the real-time status and location of any object 22 that has been detected by ALTSS 20 (past or present). Moreover, if granted access, a user may also use Internet 109 to determine the status and location of objects in other ALTSS systems in other cities around the world. ALTSS 20 may also automatically generate user-defined reports to supervisors or to specific user terminals 111 covering any time frame of system operations.

Figure 2:
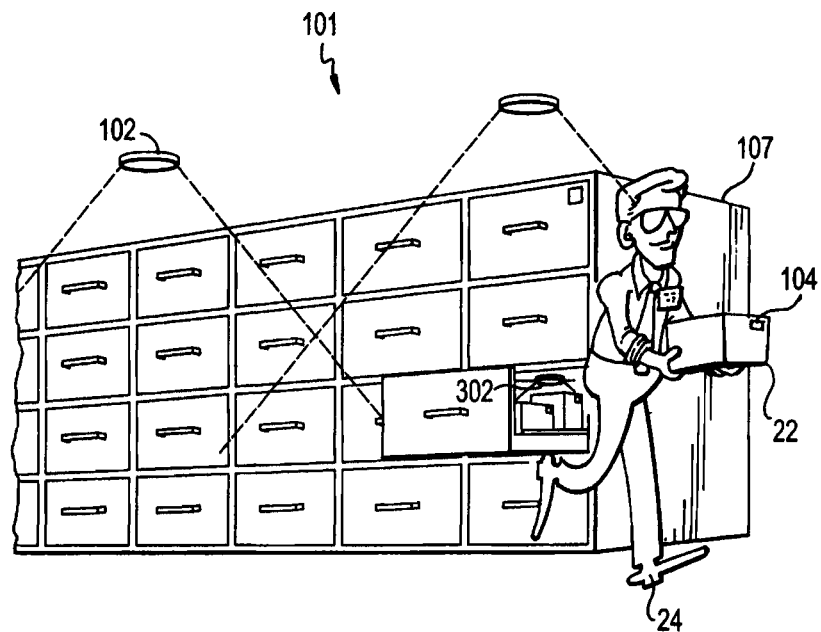
FIG. 2 is a diagram of the ALTSS apparatus of FIG. 1, illustrating how ALTSS can track evidence and a user.
Figure 3:
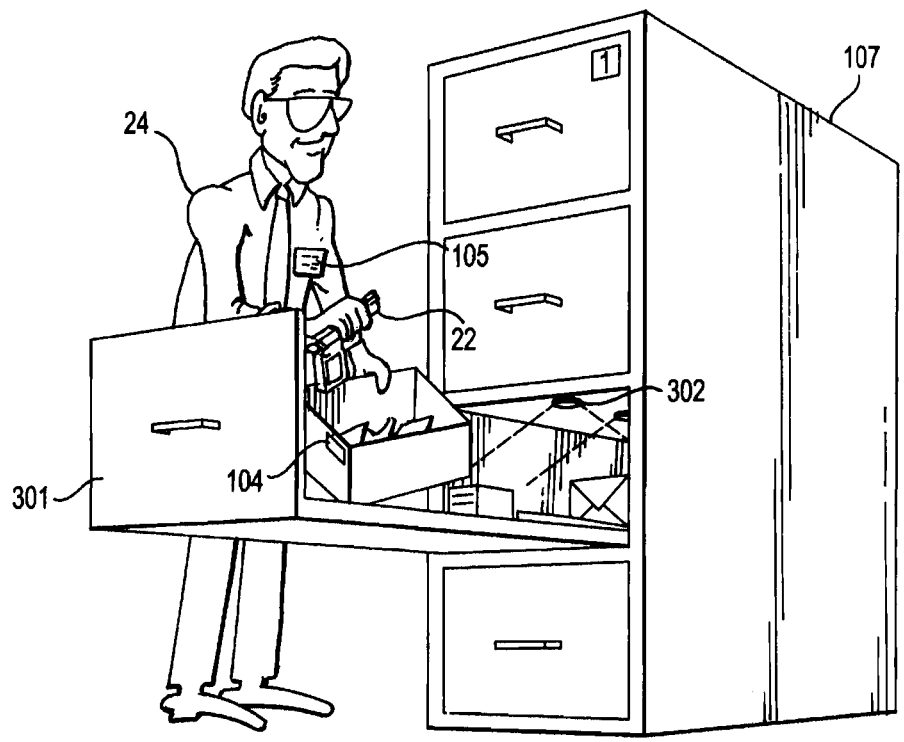
FIG. 3 is a diagram of the ALTSS apparatus of FIG. 1, installed into a container for storing, locating, and tracking objects.

Referring to FIGS. 1 and 2, an alternative view of an evidence room is disclosed and illustrates how ALTSS 20 may track evidence 22 and user 24. User 24 having access to facility 101 may have a small transponder 105 attached to his/her badge, for example. Once user 24 enters facility 101 through the field of antenna 106, he/she is identified by ALTSS 20 and further tracked throughout facility 101 via antennas 102. Any movement of transponder 104 on evidence 22 from one location to another within facility 101 would therefore be automatically tracked by ALTSS 20. Evidence taken from facility 101 by user 24 through the field of antenna 106 is automatically associated with user 24 and is logged out of ALTSS 20 with that user.

Figure 4:
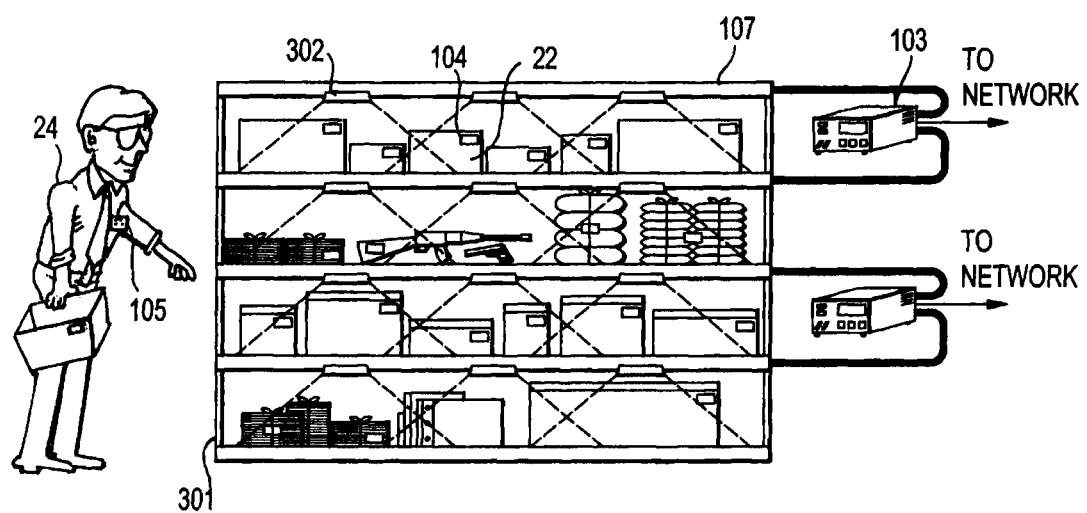
FIG. 4 is a side cutout view of the container of FIG. 3, illustrating an exemplary installation method of the ALTSS apparatus of FIG. 1.

Referring now to FIGS. 1-4, FIGS. 3 and 4 specifically provide a closer look at container 107 which may be an oversized cabinet having the look of a large office file cabinet. In the exemplary embodiment of FIG. 3, drawers 301 may be over six feet in depth and roll outward similar to the drawers of containers in a morgue. Those skilled in the art would appreciate in view of this disclosure that containers 107 may be designed to handle antennas 302 and associated cables attached to scanners 103. As shown in FIG. 4, similar to radar operations. antennas 302 along the top of the drawers 301 may divide the area of each drawer 301 into small sectors. A transponder 104 attached to evidence 22 and moved into the field of view of an antenna 302 may be detected by ALTSS 20. Data may then be transmitted to application server 110, where the back-end processing of ALTSS 20 takes place (discussed in greater detail below). Antennas 302 along the top of drawers 301 may be small in size, having a read range of approximately 18 to 20 inches, for example. Antennas 302 may be circularly polarized and transponders 104 may be read in virtually any orientation to antennas 302. The location of an object 22 in cabinet 107 would depend on the placement of antennas 302 inside the drawers. As illustrated in the exemplary embodiment of FIG. 3, the location of object 22 in cabinet 107 can be resolved to one third of drawer 301.

With specific reference to FIGS. 5-13, the back-end processing of ALTSS 20 will be discussed in detail below.

Figure 5:
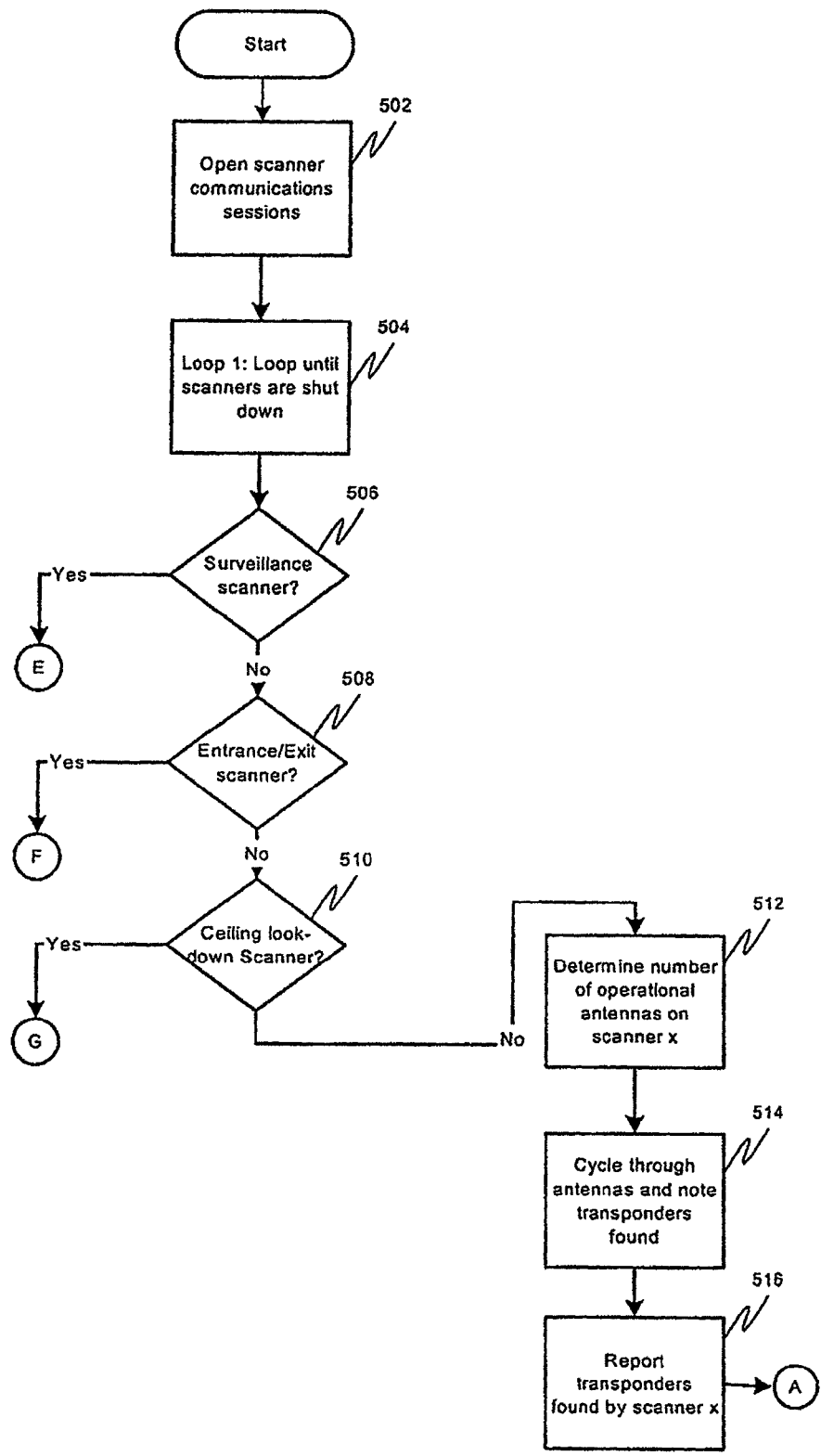
FIG. 5 is a flow chart of a process, consistent with this invention, for polling scanners in a network and collecting data on detected transponders.

As shown in FIG. 5, to start the back-end process, a scanner communications session may be established between server 110 and each scanner 103 (step 502). Loop 1, the main loop, may start and continue until all scanners 103 are disconnected manually or disconnected by means of a timing mechanism (step 504). As scanners 103 are polled, either sequentially or by a stochastically derived technique (to include a unilaterally initiated request for polling by scanner 103 based on some random event). ALTSS 20 may check the job of the selected scanner 103 at the moment. If scanner 103 deals with the surveillance of physical evidence, path "E" would be taken (step 506). If scanner 103 monitors the entrance or exit of an evidence room or facility, path "F" would be taken (step 508). If the scanner 103 is attached to antennas 102 that are located in the ceiling of facility 101, path "G" would be taken (step 510). Otherwise, scanner 103 involves the locating and tracking of physical evidence 22 in ALTSS containers 107.

For those scanners 103 involved with the locating and tracking of physical evidence 22 (with transponder 104 attached) in container 107, scanner 103 may first determine the number of active antennas 302 that are attached (step 512). Scanner 103 may then cycle through each antenna 302 and list all transponders 104 in the antenna's field of view (step 514). On command, scanner 103 may report the specific transponders 104 found by each antenna 302 (step 516).

Figure 6:
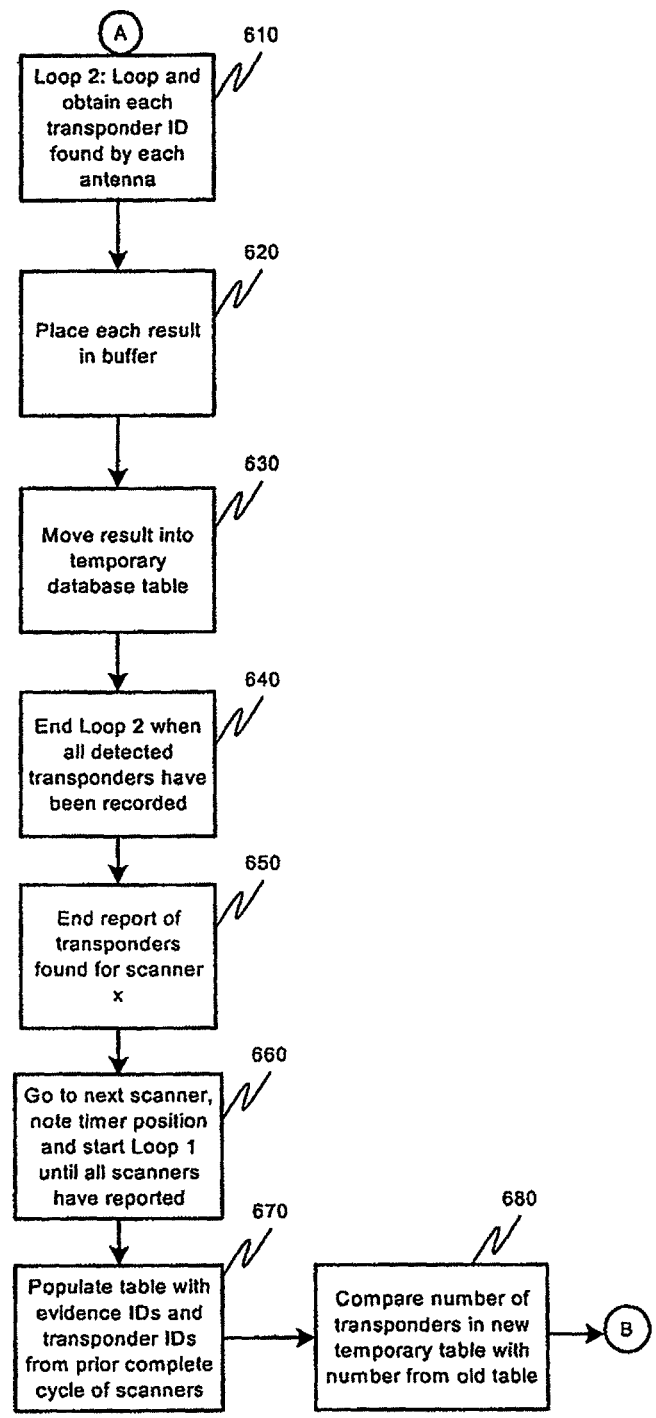
FIG. 6 is a flow chart of a process, consistent with this invention, for placing transponder readings from different scanners into a database.

As shown next in FIG. 6, Loop 2, an internal loop (step 610), is started and each reported ID for transponder 104 (also referred to as transponder ID 104), along with the attendant ID for antenna 302 (also referred to as antenna ID 302), may be placed in a buffer (step 620). This information may then be moved into a temporary database table (step 630). Loop 2 continues until all detected transponder IDs 104 and antennas IDs 302 involved are recorded in the temporary table (step 640). Scanner 103 may then end its report of transponder IDs 104 and antenna IDs 302 (step 650). The system may then go to the next scanner 103, note the timer position, and start Loop 1 (step 660). Loop 1 may continue until all scanners have reported their findings (step 504).

ALTSS 20 may then populate a table, designated the old table, with all transponder IDs 104 that have been attached to items of evidence and entered therein at an initial time (step 670). A separate table, designated the evidence status table or new table, may contain the processed results and adjustments of evidence IDs and transponder IDs 104 from the last complete cycle of scanners 103. The system may then compare the number of transponder IDs 104 detected and placed in the temporary new table with the number of transponder IDs 104 known to be in the system at an initial time (i.e. those in the old table) (step 680).

Figure 7:
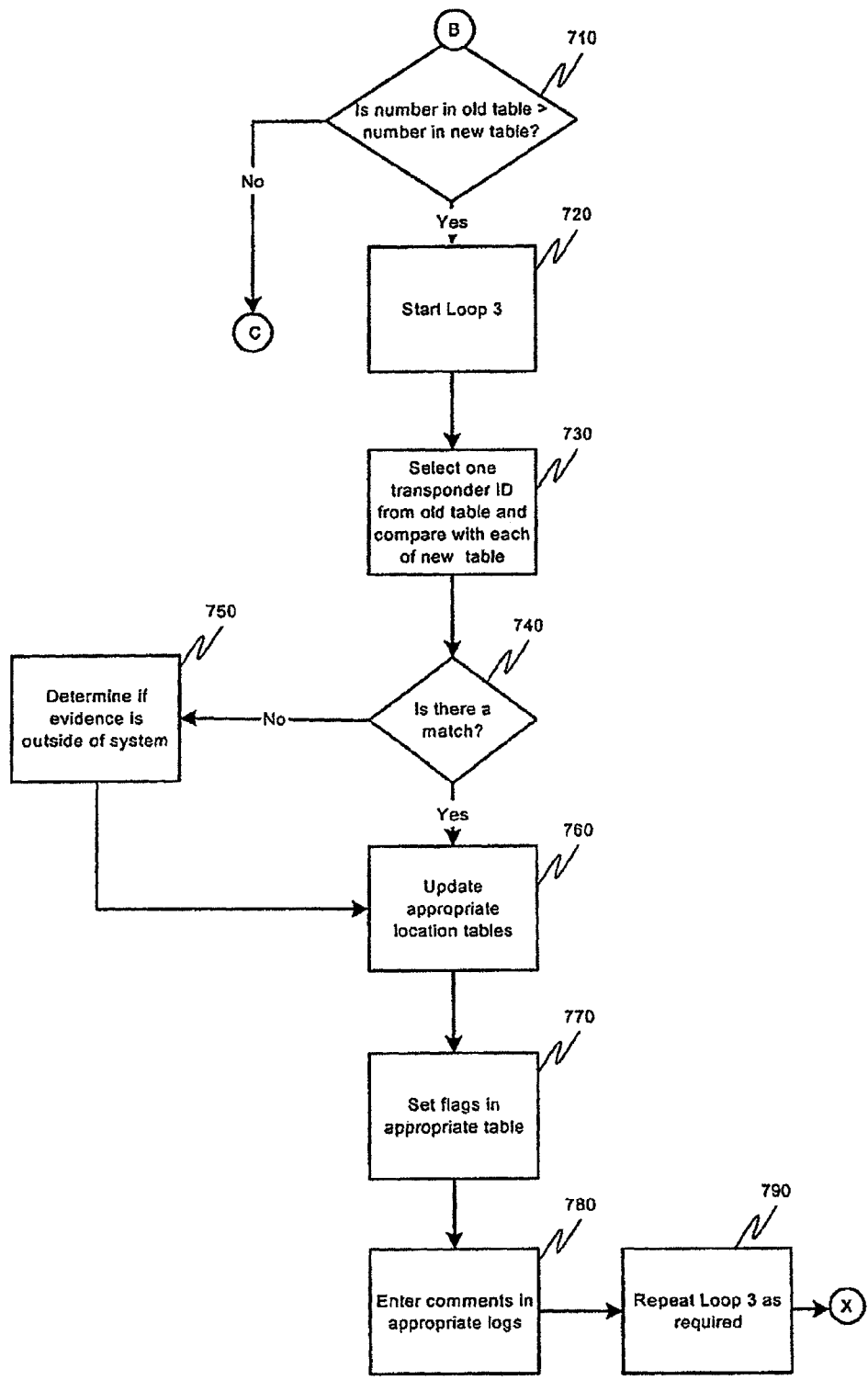
FIGS. 7, 8, 9, and 10 are flow charts of processes, consistent with this invention, for Locating, identifying, and tracking objects.

Continuing from step 680 into FIG. 7, if the number of transponder IDs 104 in the old table is greater than the number in the temporary table (step 710), ALTSS 20 may then start Loop 3 (step 720). If not, ALTSS 20 may follow path "C". During Loop 3, which is another internal loop and is explained in greater detail below, ALTSS 20 may select one transponder ID 104 from the old table and compare it with each transponder ID 104 of the new table (step 730). If there is a match (step 740), ALTSS 20 may update the location of the evidence in an evidence location table based on the location of the sensing, antenna (step 760). ALTSS 20 may then set appropriate flags in the location table if, for example, the physical evidence is being placed back into the system (step 770). ALTSS 20 may also enter the date and time and comments in appropriate system logs (step 780). If there is not a match (step 750), ALTSS 20 may set appropriate flags and make entries in the logs indicating that evidence 22 is now outside container 107. Loop 3 may be repeated until all old and new transponder IDs and evidence IDs 104 are accounted for (step 790).

Figure 8:
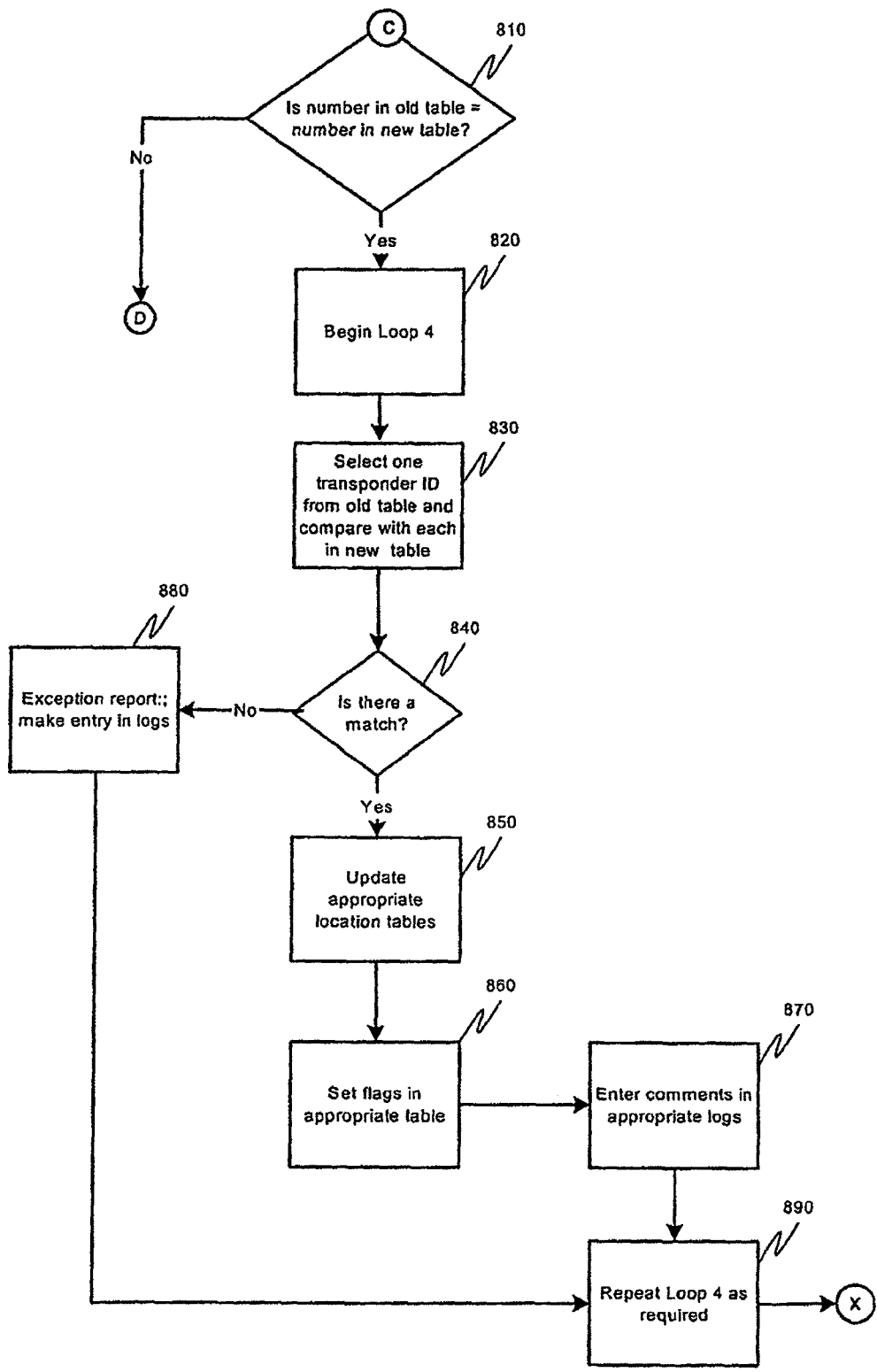

Continuing from FIG. 7 to FIG. 8, when ALTSS 20 follows path "C", it encounters a decision statement that asks whether the number in the old table is equal to the number in the new table (step 810). If the answer is yes, the system starts Loop 4 (step 820). If the answer is no, the system follows path "D". During Loop 4, another internal loop, ALTSS 20 may select one transponder 11) 104 from the old table and compare it with each transponder ID 104 of the new table (step 830). If there is a match (step 840). ALTSS 20 may update the location of the evidence in the evidence location table based on the location of the sensing antenna 302 (step 850). Appropriate flags, dates, and times may be set in the table and comments may be made in the logs if evidence leaves or enters ALTSS 20 (steps 860 and 870). Loop 4 may be repeated until all old and new transponder IDs 104 are accounted for (step 890). If a match is not found during the comparative process, alarms and reports may be generated and entries may be made in the logs (step 880). Loop 4 may be repeated until all transponder IDs are accounted for (step 890).

Figure 9:
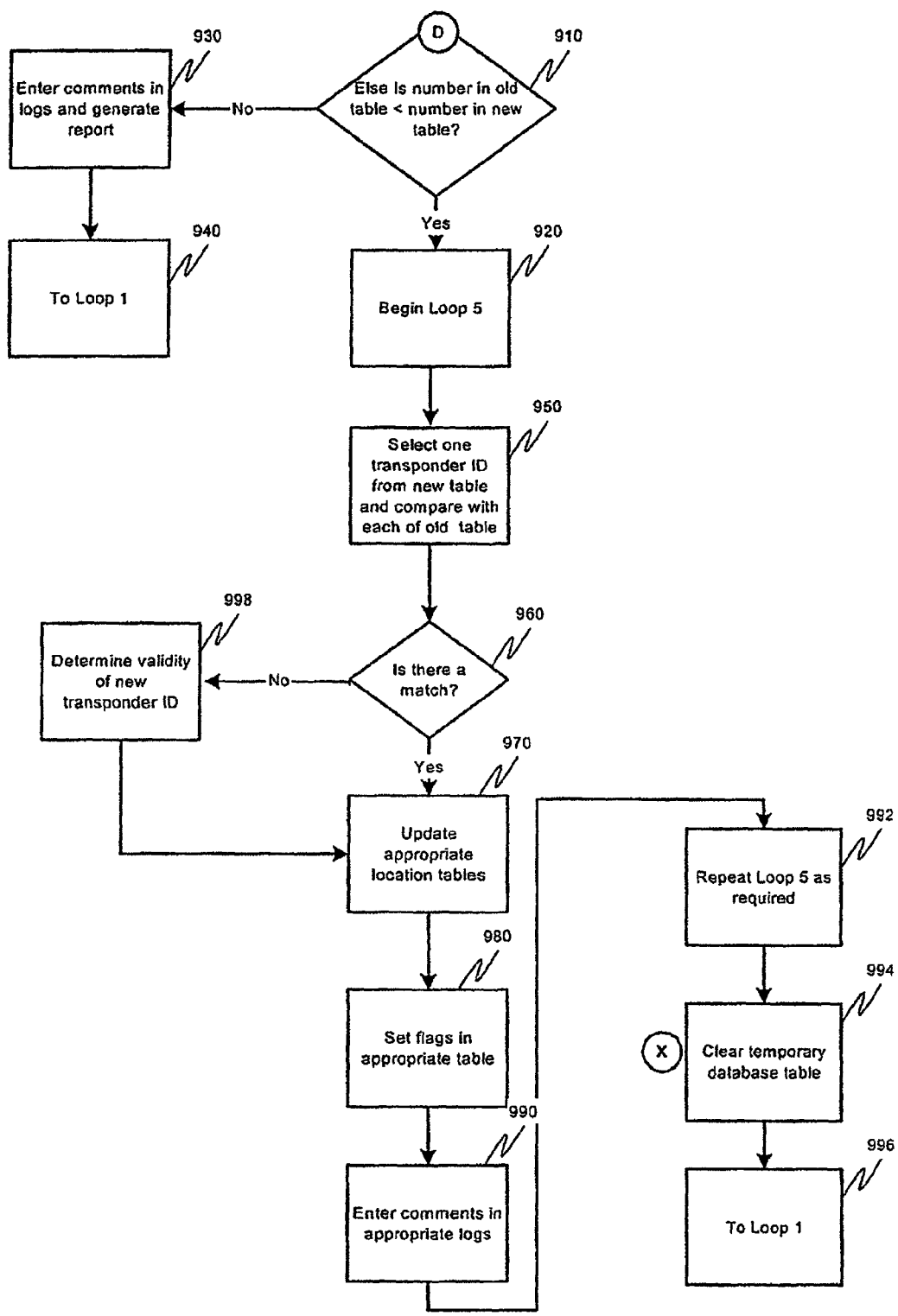

Continuing from FIG. 8 to FIG. 9, if ALTSS 20 follows path "D", it encounters a decision statement that asks whether the number in the old table is less than the number in the new table (step 910). If the answer is yes, ALTSS 20 may start Loop 5 (step 920). If the answer is no, ALTSS 20 may proceed into a safety mode in which alarms and reports are generated and comments are made to logs (step 930). ALTSS 20 may then return to Loop 1, the main loop (step 940). During Loop 5, ALTSS 20 may select one transponder ID 104 from the new table and compare it with each transponder E) 104 of the old table (step 950). If there is a match (step 960), ALTSS 20 may then update the location of the evidence in the evidence location table based on the location of sensing antenna 302 (step 970). Again, appropriate flags, dates and times may be set in the table and comments may be made in the logs if evidence 22 equipped with a transponder 104 enters the system (steps 980 and 990). Loop 5 may be repeated until all known transponder IDs are accounted for (step 992). If a match is not found at step 960, ALTSS 20 may attempt to determine the validity of the transponder ID and/or generate alarms and reports and place comments in the logs (step 998). After accounting for the location and status of all transponder IDs and making adjustments to tables. ALTSS 20 may clear the temporary database table (step 994) and return to Loop 1 (step 996).

Figure 10:
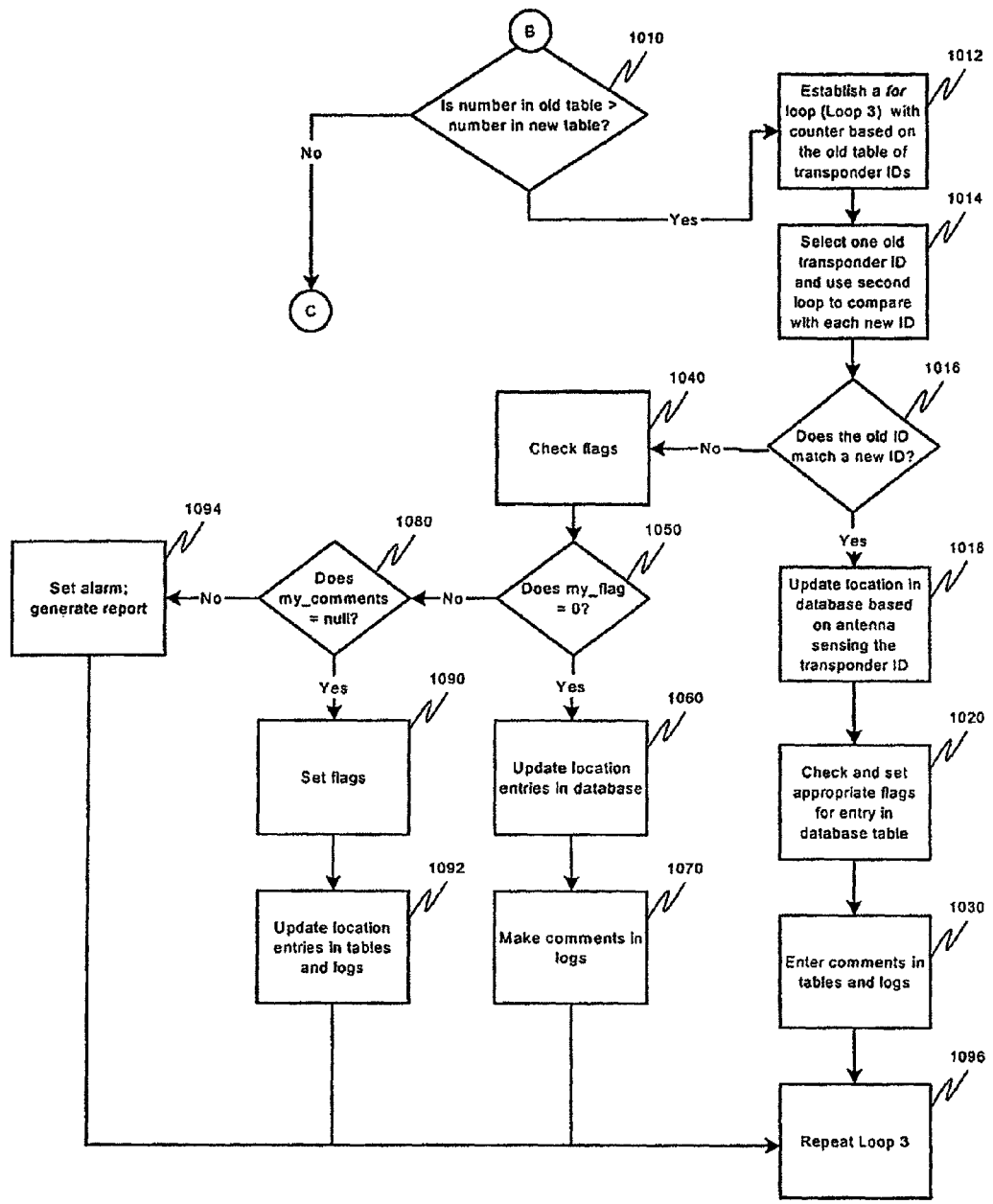

FIG. 10 provides a more detailed look at the actions inside Loop 3 involving steps 720 to 790 above. Specifically, if the number of transponder IDs 104 in the old table is greater than the number in the new table (step 1010), ALTSS 20 may establish a for loop (Loop 3) with a counter that is based on the number of transponder IDs 104 in the old table (step 1012). ALTSS 20 may then select one transponder ID 104 from the old table and establish a separate inner loop to compare that transponder ID 104 with each of the transponder IDs 104 from the new table (step 1014). If the old transponder II) 104 matches the new transponder ID 104 (step 1016), ALTSS 20 may update the location of evidence 22 in the evidence location table based on the physical location of the sensing antenna 302 (step 1018). The flags in the evidence location table may be checked to determine whether evidence 22 is being returned to the system. If so, appropriate flags may be changed (step 1020). Appropriate comments may also be made automatically in the location table and in separate log tables (step 1030). If the old transponder ID 104 does not match any of the new transponder IDs 104 at step 1016, the flags for the old transponder ID 104 may be checked in the evidence location table (step 1040). The first flag being set to zero would indicate evidence 22 being removed from containers 107 (step 1050). The flag may be changed to indicate this action and updated entries may be made to the evidence location table and logs (steps 1060 and 1070). If the first flag is not set to zero, a second flag may be checked (step 1080). The second flag being null would indicate transponder 104 being attached to a new piece of evidence now entering ALTSS 20. To reflect this action, appropriate flags may be set for transponder 104 and the associated piece of evidence 22 in the location table (step 1090). The physical location of evidence 22 may be updated in the location table and comments may be made in the system logs (step 1092). If the second flag is not null, ALTSS 20 may generate an alarm indicating a deviation therein requiring management attention (step 1094). Loop 3 may be repeated until all transponders 104 are accounted for (step 1096).

Figure 11:
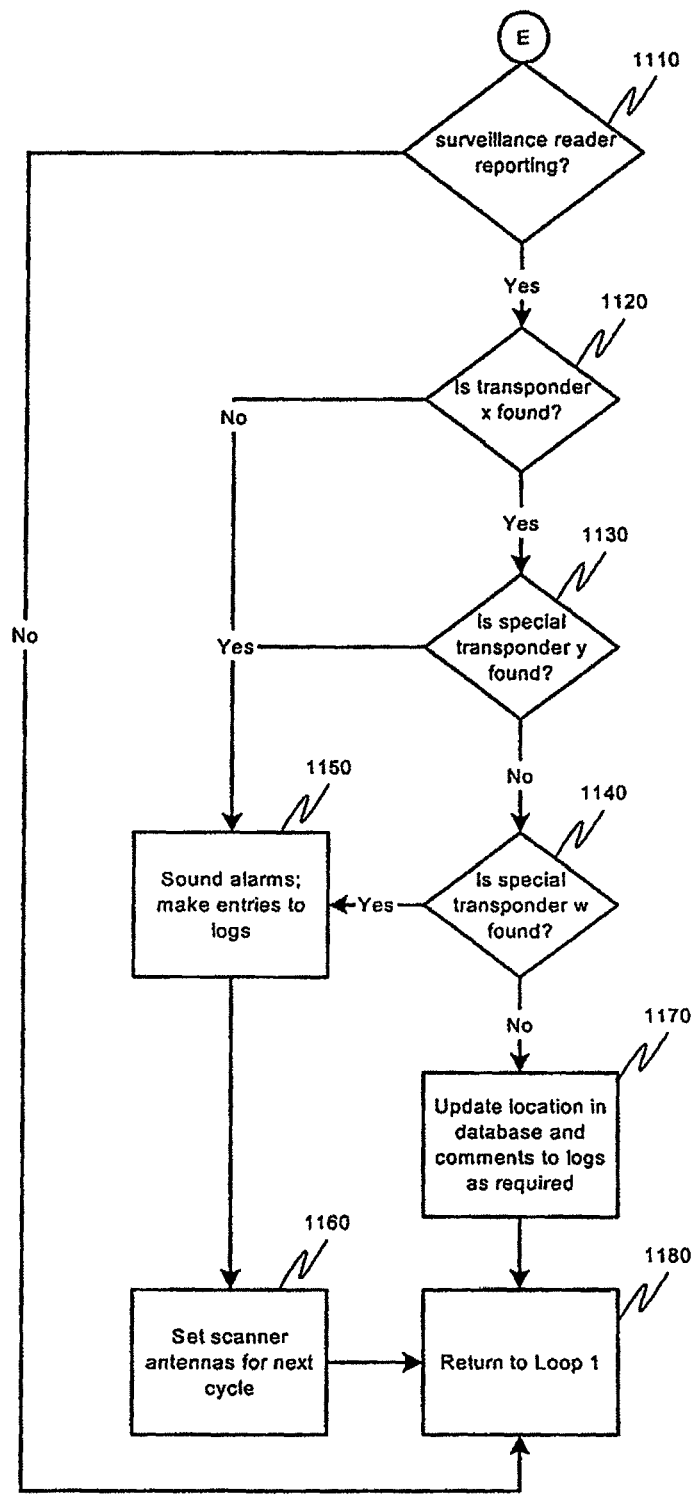
FIG. 11 is a flow chart of a process, consistent with this invention, for providing surveillance of objects in an area.

FIG. 11 is a flow diagram (path "E") of the case in which a dedicated scanner 103 is associated with the surveillance of physical evidence in an area. The first decision point along path "E" may be whether scanner 103 is set for dedicated surveillance of objects 22 (step 1110). If so, the system may move to step 1120. If scanner 103 does not find the proper transponders "x" 104 (that are attached to evidence 22) in its field of view, ALTSS 20 may activate alarms. generate reports, and make entries in the logs (step 1150). If the transponders "x" 104 are found, the next decision point may be whether special hidden transponders "y" 104 are detected by the system (step 1130). If evidence 22 is moved in a certain direction, the special transponders "y" 104 may be exposed to the scanner's antennas (either 102 or 302). Assuming that transponders "y" 104 are not detected, the system may move to the next decision point (step 1140). If evidence 22 is moved in a different direction, special transponders "w" 104 may be exposed to antennas 102 or 302. Exposure of transponders "y" or "w" 104 may sound alarms and generate reports (step 1150). Otherwise, ALTSS 20 may update the status and timestamps of the evidence location table and the system logs as required (step 1170). ALTSS 20 may then set the scanner's next polling cycle and return to Loop 1 (steps 1160 and 1180). It should be noted that the dedicated surveillance scanner(s) 103 may be polled more frequently than the other scanners 103.

Figure 12:
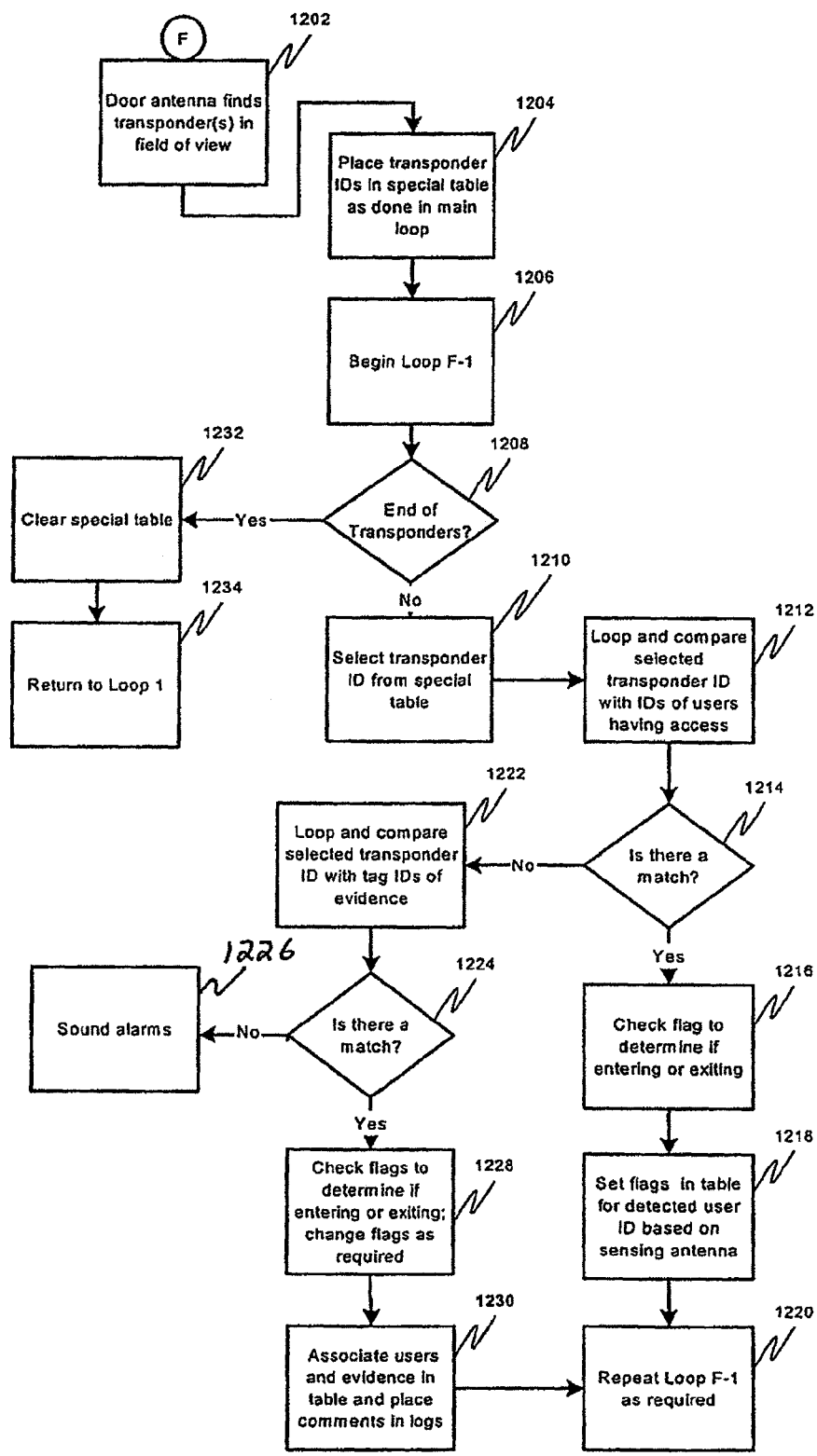
FIG. 12 is a flow chart of a process, consistent with this invention, for detecting transponders and processing data from transponders attached to objects and people at the entrance and exit of a facility.

FIG. 12 (path "F") shows the case in which polled scanner 103 is associated with the detection of transponders 104 or 105 at the entrance or exit 112 of an evidence handling facility 101 (step 1202). The current invention assumes that all users having access to facility 101 Would wear prominently exposed badges. As discussed above, attached to the badge of a user 24 may be a small transponder 105 that may be detected by properly placed system antennas 106 at the entrance and exit 112 of facility 101. If a door antenna 106 detects transponders 104 or 105 in its field of view, ALTSS 20 may place transponder IDs 104 or 105 and their date-time stamps (in terms of thousands or millions of seconds) in a buffer and then in a special table via actions similar to the actions taken in Loop 1 (step 1204). Data on detected transponders 104 or 105 may be placed in the buffer according to the time that the detection takes place. Those transponders 104 or 105 that enter the field of view of a given antenna 102 or 302 first, may be detected first according to their times of arrival in thousands or millions of a second, for example, ALTSS 20 may then begin Loop F-1 (step 1206), and then check to see whether the last transponder 104 or 105 in the special table has been handled (step 1208). If not, a transponder ID 104 or 105 may be selected from the special table (step 1210) and a separate inner loop may be established for comparing the transponder ID 104 or 105 with the transponder IDs 105 associated with users 24 having access to facility 101 (step 1212). If a match occurs (step 1214), ALTSS 20 may check a flag for that user 24 in the users' table to determine if user 24 is entering or exiting facility 101 (step 1216). A user 24 entering facility 101 will have the flag set to zero. Once inside entrance 112, the flag may be set to one. The location of user 24 at entrance 112 may also be recorded (step 1218). Loop F-1 may be repeated if more than one transponder is detected at entrance 112 (step 1220). If the next transponder 104 or 105 being examined does not match a transponder ID 105 associated with a user 24 (step 1214), a separate inner loop may be established for comparing the transponder ID 104 Or 105 with the transponder IDs 104 associated with all physical evidence 22 in the system (step 1222). If there is not a match (step 1224), ALTSS 20 may generate an alarm and send a report to management. An entry may also made in the system logs of ALTSS 20 (step 1226). If there is a match, ALTSS 20 may check a flag for that piece of evidence 22 in the evidence location table to determine if evidence 22 is entering or leaving facility 101. A piece of evidence 22 entering facility 101 would have its table flag set to zero (step 1228). Next, a series of processes may be taken to associate evidence 22 entering or leaving facility 101 with a user 24 entering or leaving facility 101. Essentially this is done by linking user 24 with the item of evidence 22 where the transponder-detected times between the user and evidence are minimal when compared with the transponder-detected times between the evidence in question and any other user entering facility 101 in a given timeframe (step 1230). ALTSS 20 may then make appropriate entries in the system logs (step 1230). When all detected transponders in the special tables have been handled, all special tables may be cleared (step 1232), and ALTSS 20 may return to Loop 1 (step 1234).

Figure 13:
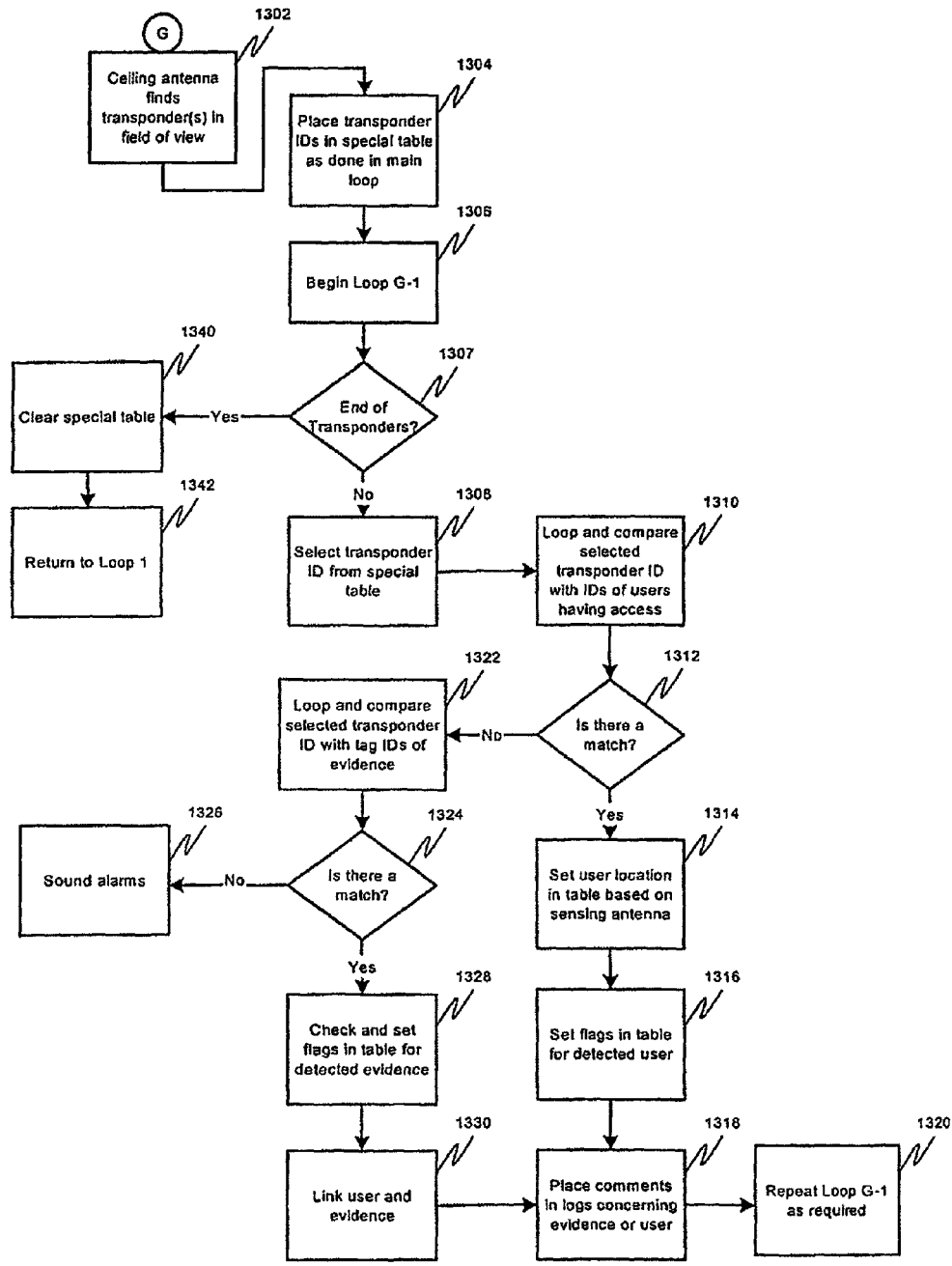
FIG. 13 is a flow chart of a process, consistent with this invention, for employing ceiling antennas for detecting transponders and tracking transponders attached to objects and people in a facility.

FIG. 13 (path "G") shows the case in which the polled scanner 103 is associated with ceiling antennas 102. As discussed above, antennas 102 may be much larger than antennas 302 used in ALTSS containers 107, and include a much greater read range. Antennas 102 may be circular polarized antennas so that the orientation of transponders 104 or 105 is not a factor. A transponder 104 passing within the field of view of antenna 102 would therefore be detected. Similar to radar operations, facility 101 may be divided into sectors and each antenna 102 may cover one of the sectors. Thus, any movement of a transponder 104 or 105 from one sector to another may be detected and tracked. The ceiling scanner 103 may cycle through each antenna 102 and list all transponders 104 or 105 in the antenna's field of view. If a ceiling antenna 102 detects transponders 104 or 105 in its field of view (step 1302), ALTSS 20 places the transponder IDs 104 or 105 and the transponders' times of detection in a special table via actions similarly to the actions taken in Loop 1 (step 1304). ALTSS 20 may then begin Loop 0-1 (step 1306) and check to see whether the last transponder 104 or 105 in the special table has been handled (step 1307). If ALTSS 20 has handled the last transponder 104 or 105, it may clear the special table (step 1340) and return to Loop 1 (step 1342). If not, one transponder ID 104 or 105 may be selected from the special table (step 1308) and a separate inner loop may be established that compares the transponder ID 104 or 105 with the transponder IDs 105 associated with users 24 having access to facility 101 (step 1310). If a match occurs (step 1312), ALTSS 20 may check a flag for that user in the users' table to determine if user 24 has properly entered facility 101. ALTSS 20 may then record the time and location of user 24 in the users' table based on the sector covered by the sensing antenna 102 (step 1314). Another flag may be set for user 24 in the users' table that indicates that a certain ceiling antenna 102 has detected the presence of the user (step 1316). ALTSS 20 may then place any further comments in the logs (step 1318) and repeat Loop G-1 as required (step 1320). If there is not a match during the next iteration of the loop (step 1312), a separate inner loop may be established that compares transponder ID 104 or 105 in question with the transponder IDs 104 associated with all physical evidence 22 (step 1322). If there is not a match (step 1324), ALTSS 20 may generate an alarm and report to management (step 1326). If there is a match, ALTSS 20 may check a flag for that piece of evidence 22 in the evidence location table to determine if the evidence is checked out of the ALTSS containers 107. Another flag may be set in the evidence location table to indicate that a ceiling antenna 102 has detected the presence of the evidence (step 1328). According to the detected transponder times in hundreds of a second, for example, transponder ID 105 representing the user and transponder ID 104 representing evidence may be linked at the sector location (step 1330). ALTSS 20 may then record the location and/or time of evidence 22 in the evidence location table based on the sector covered by sensing antenna 102 (step 1318). When all transponder IDs in the special table have been handled, the special tables may be cleared (step 1340), and ALTSS 20 may return to Loop 1 (step 1342).

It should be noted that all actions of user 24 with ALTSS 20 and the system responses to those actions occur via the front-end. The back-end processing of ALTSS 20 occur in the background, and are preferably configured to be out of reach of the user.

Figure 14:
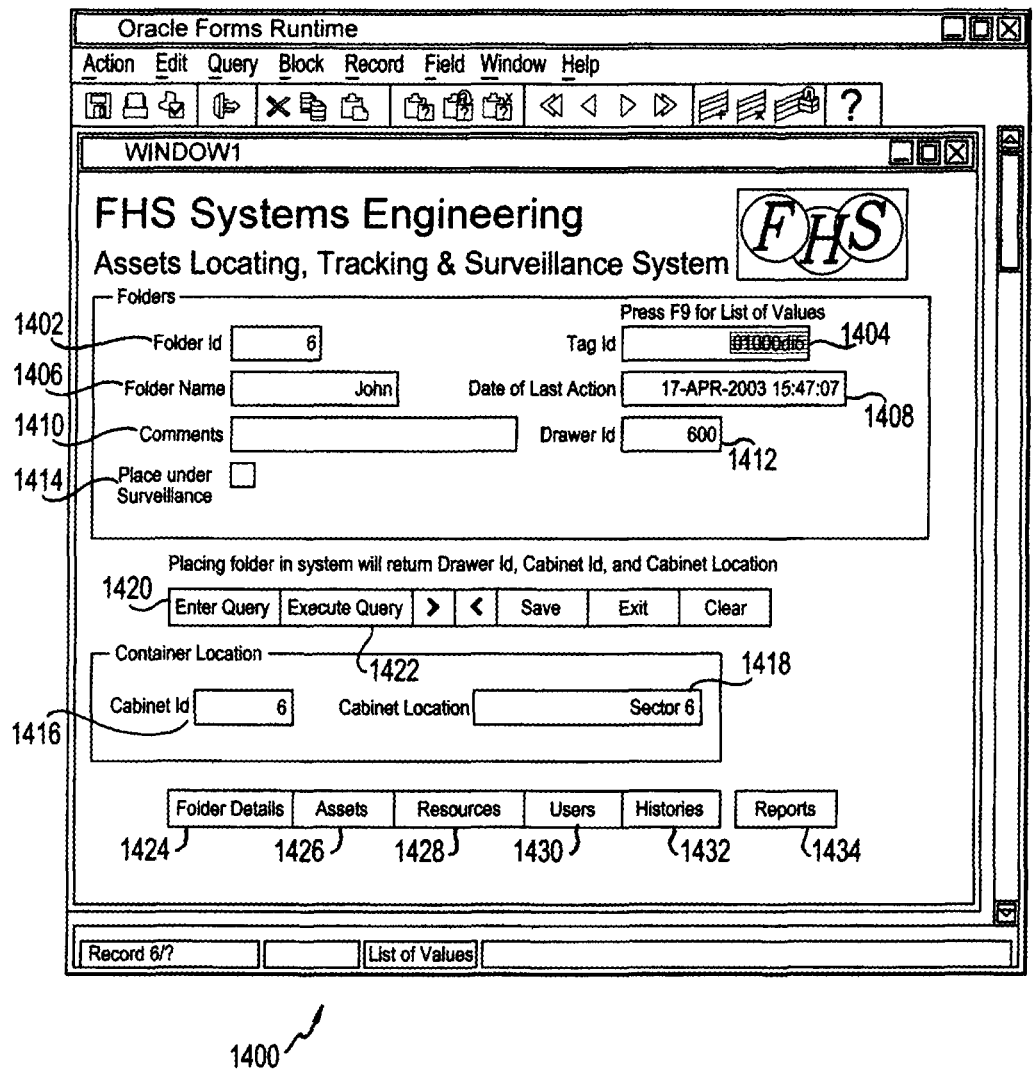
FIG. 14 is an exemplary graphic user interface, consistent with this invention, for inputting data into and extracting information from ALTSS.

Referring now to FIG. 14, an exemplary graphic user interface 1400 is disclosed. User interface 1400 may be at form to input data into ALTSS 20, to delete data from ALTSS 20, and to query information about operations in ALTSS 20. In an exemplary embodiment, user interface 1400 may be created with Oracle 9i or later software, but may likewise be created with appropriate software from other software vendors, such as Microsoft or Sun (JAVA), so long as user interface 1400 can interact with the underlying database. Those skilled in the art would also appreciate in view of this disclosure that the labels assigned to the blocks on user interface 1400 are for exemplary purposes only, and may be changed according to the needs of a specific user.

Referring to FIG. 14, the first block may be labeled "Folder Id" 1402, and may be used to assign the identification number to evidence of object 22 or to an asset. In the case of evidence, the identification number may be assigned to a piece of physical evidence. The number may normally be a sequential number that is automatically presented by the system for assignment to the next object. User 24 may accept the number or choose a different number. The next block on the right may be labeled "Tag Id" 1404, which may be a unique transponder number that identifies transponder 104 or 105 in ALTSS 20. ALTSS 20 may present transponder IDs 104 or 105 in the form of a list of values to user 24. By accepting this number, user 24 assigns transponder ID 104 to numbered object 22 identified by first block 1402. The next block may be labeled "Folder Name" 1406. For evidence, the information contained in block 1406 may represent, for example, a case name such as "Dillinger." The next block to the right may be labeled "Date of Last Action" 1408. which may be the date and time of the last action involving object 22. An action may include, for example, object 22 being moved from ALTSS 20 or being moved to another container 107. The next block may be labeled "Comments" 1410, and may be used for cryptic comments about a case. The next block may be labeled "Drawer Id" 1412, and may provide the location of the evidence by sector and drawer number. For example, block 1412 may contain "Sector 2-2" which means sector two of drawer two. The next block may be labeled "Surveillance of object" or "Place under Surveillance" 1414. By checking block 1414. user 24 may place object 22 in question under surveillance. User 24 may place one, some, or all objects 22 in the system under surveillance. Additional details about this surveillance approach are discussed in reference to FIG. 17 below. Skipping the row of buttons in the center of FIG. 14 for the moment, the next data block may be labeled "Cabinet Id" 1416. The information may represent the cabinet number of cabinet 107 containing drawer 301 indicated in the "Drawer Id" block above (see 1412). The last block may be labeled "Cabinet Location" 1418, which is self-explanatory.

Normally, ALTSS 20 may set user interface 1400 for input of new data by a user. Only the first three blocks may be used to enter an object or piece of evidence 22 into ALTSS 20. The "Folder Id" may be given by ALTSS 20. The next "Tag Id" may be presented by the system and chosen by user 24. User 24 may then enter the name of object 22 into ALTSS 20. By clicking the button labeled Save, user 24 may place object 22 into ALTSS 20. User 24 may then physically attach transponder 104 to object 22 and place object 22 into container 107. ALTSS 20 may then electronically locate and track object 22 while it is in the system.

To find the location or status of an object or piece of evidence 22, user 24 may click the Enter Query button 1420 to place ALTSS 20 in the query mode. If user 24 knows the "Folder Id" 1402. "Folder Name" 1406 or an alias, then user 24 may enter any or all of this information at user interface 1400 and click on the button "Execute Query" 1420. The specific location of object 22 or its status and other information may be displayed at user interface 1400. Those skilled in the art would appreciate in view of this disclosure that the buttons labeled "next record" (>), "prior record" (<), Save, Exit, and Clear are all standard buttons on a user interface. and therefore, these buttons will not be described in further detail.

Figure 15:
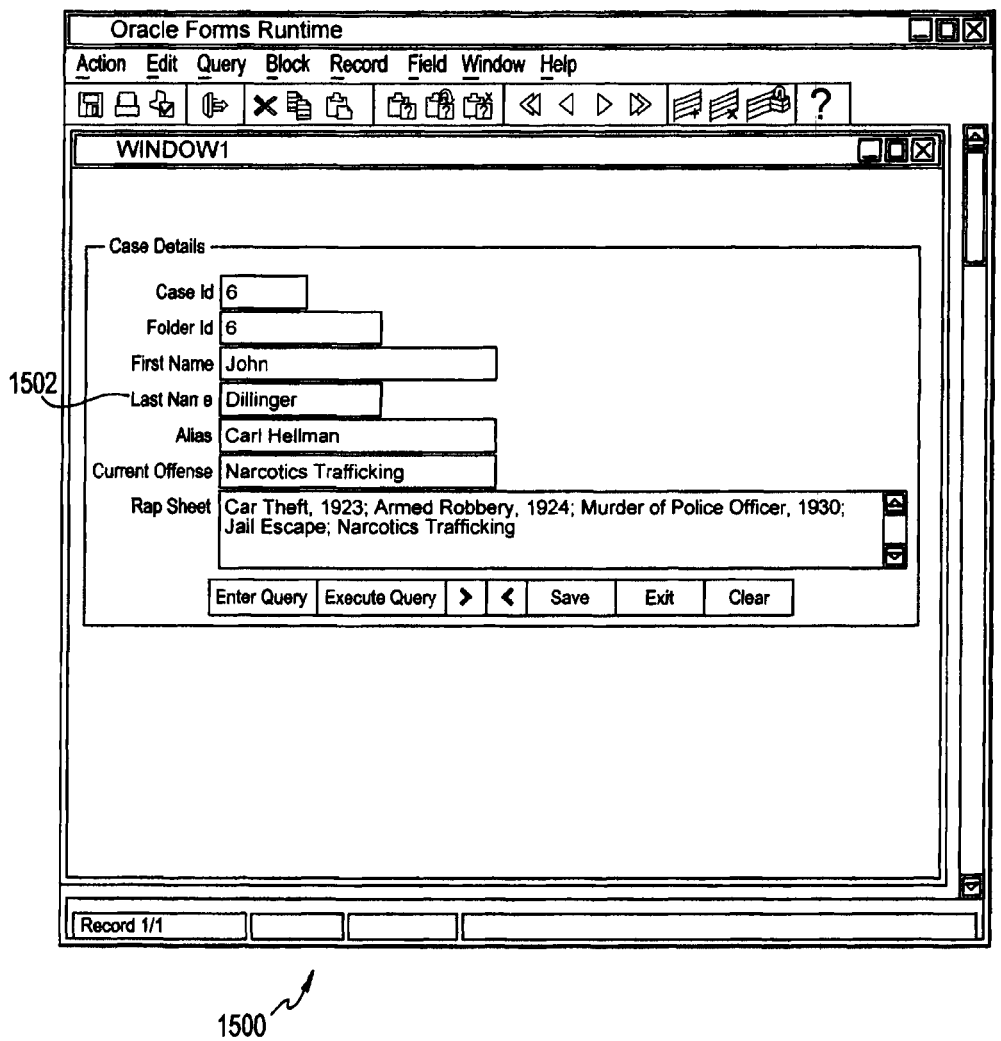
FIGS. 15 and 16 are illustrations of data outputs, consistent with this invention, resulting from the front-end processing of ALTSS.

At the bottom of user interface 1400, the button labeled Folder Details 1424 may cause additional information to appear concerning the subject of a query. For example, suppose a query is run on the location of a piece of physical evidence in the case of John Dillinger, in order to obtain some additional information about this individual, user 24 may click Folder Details button 1424. FIG. 15 shows the new form 1500 that is displayed with additional information about John Dillinger 1502.

Figure 16:
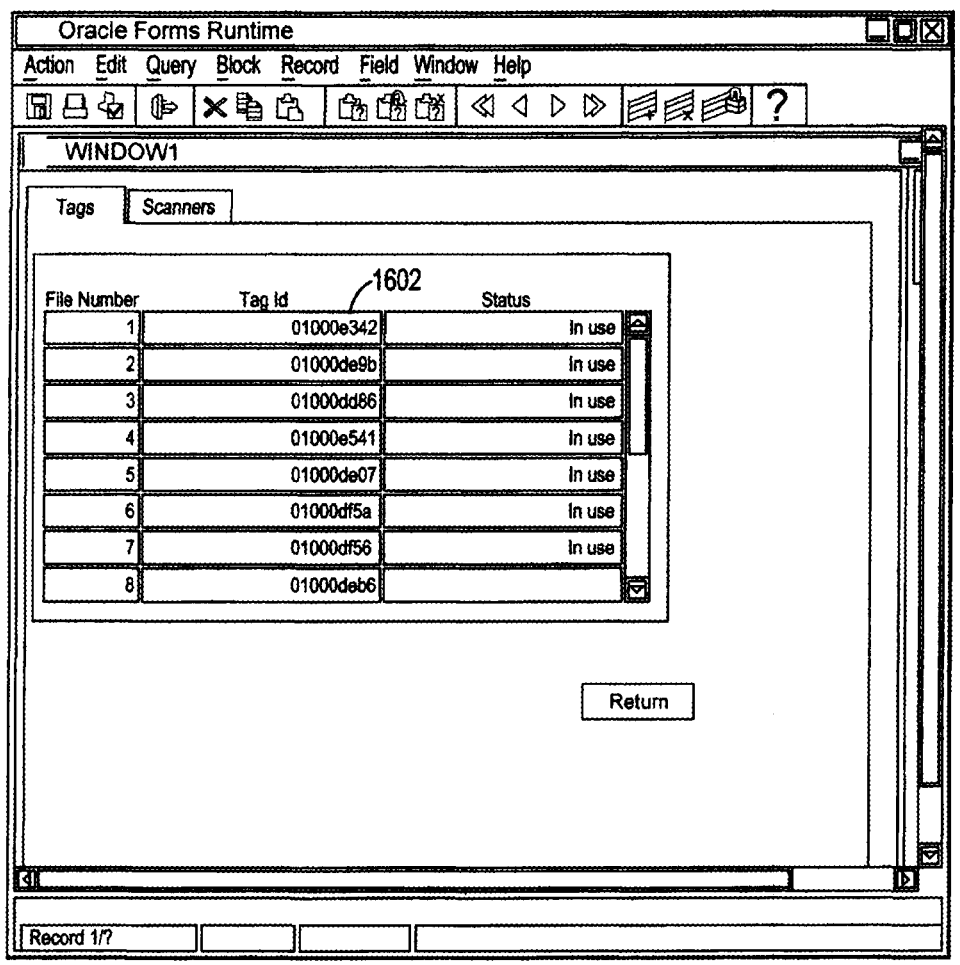

Referring back to the main user interface 1400 of FIG. 14, when user 24 clicks the button labeled Assets 1426. ALTSS 20 may present a table containing a list of all objects or evidence 22 that are being handled. When user 24 clicks the button Resources 1428. ALTSS 20 may present a series of tables containing the resources of the system, such as transponders, scanners, antennas, drawers, cabinets, network devices, and other devices. FIG. 16 shows an example of a table for transponders IDs 104 or 105 (1602). Referring back to the main user interface 1400 of FIG. 14, when user 24 clicks the button Users 1430. ALTSS 20 may present a listing of all users having access to the system. When user 24 clicks the button Histories 1432, ALTSS 20 may present a series of tables of system logs, listing all operations within the system. After a period of operations, it is apparent that a great deal of information will be stored in the system's database. By clicking on the button Reports 1434, user 24 may be presented with a parameter form, by which he/she can select the kinds of information he/she wants to view. For example, user 24 may want to see the objects entering and leaving facility 101 during a time period. Alternatively, user 24 may want to know the individuals entering facility 101 during a time period and the items taken from the facility. User 24 may also want to know the items logged outside of ALTSS 20 beyond a specific time period. These kinds of reports and more can be generated automatically by ALTSS 20 and sent to a designated user terminal (for example, the terminal of a supervisor).

Figure 17:
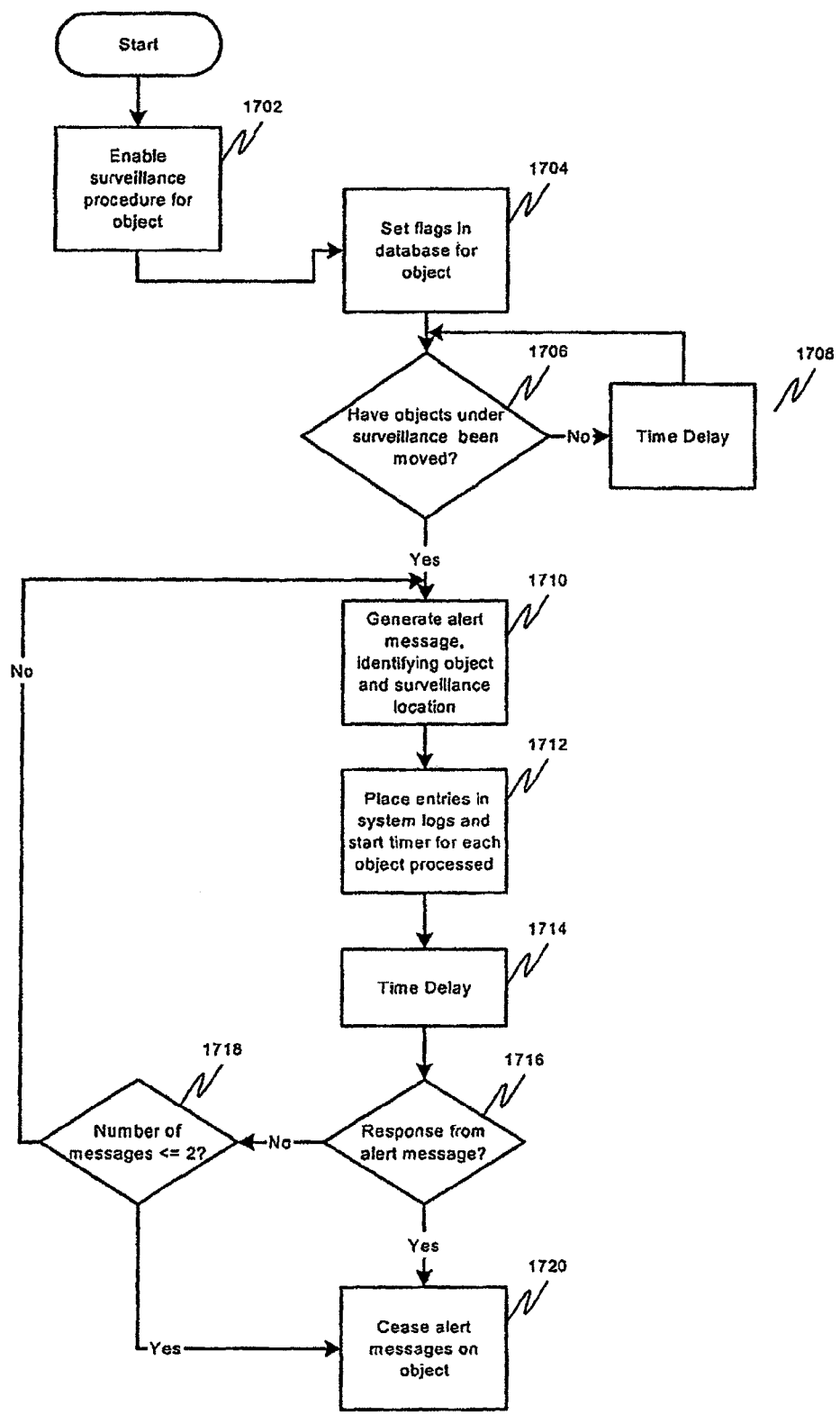
FIG. 17 is a flow chart of a process, consistent with this invention, for providing surveillance of individual objects.

FIG. 17 expands the discussion for the case in which a user wants to provide surveillance on a particular object at surveillance block 1414 (FIG. 14). When user 24 selects surveillance block 1414, ALTSS 20 enables the surveillance procedure for object 22 (step 1702) and sets appropriate flags in the database (step 1704). ALTSS 20 then sets other flags in the database when object 22 is moved. If object 22 under surveillance has not moved (step 1706), ALTSS 20 encounters a time delay before checking again for any movement (step 1708). If object 22 has moved. ALTSS 20 may generate an alert message to user 24, identifying the object and its surveillance location (step 1710). ALTSS 20 may then place appropriate entries in the system logs and start a timer for each object 22 (step 1712). After a time delay (step 1714), the system may check for any response or action caused by the message (step 1716). If no response or action has been taken, ALTSS 20 may send a second alert message (steps 1718 and 1710). After two alert messages have been sent, or a response to a message has been received, or some action has been taken, ALTSS 20 may cease to send alert messages concerning object 22 (step 1720).

Figure 18:
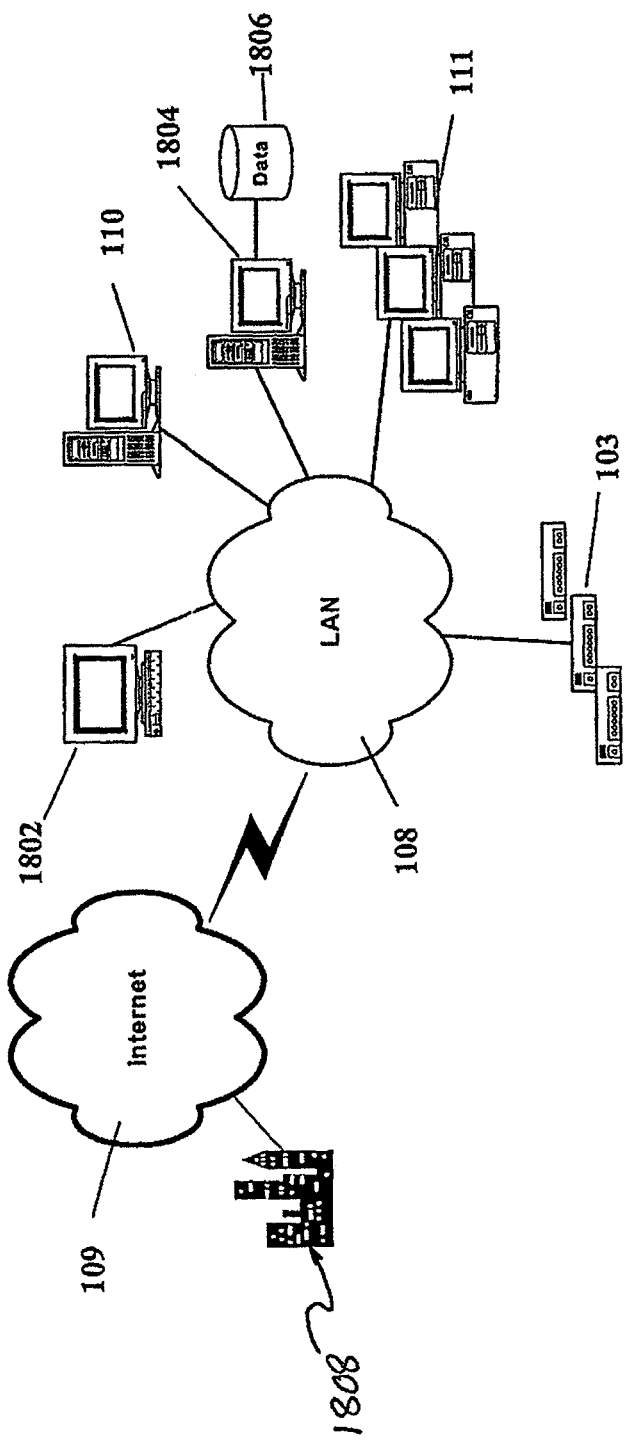
FIG. 18 is an exemplary diagram of a network employing the ALTSS apparatus of the present invention.

For the ALTSS 20 apparatus and method described above, having more than one scanner 103 in the system requires that the scanners 103 be networked. FIG. 18 is an exemplary diagram of such a network employing the ALTSS 20 apparatus of the present invention. Referring to FIG. 18, an Ethernet local area network 108 may tie together application server 110, database server 1804. user terminals 111, and a number of scanners 103. Those skilled in the art would appreciate in view this disclosure that Ethernet 108 may be an enterprise network having many attached components in addition to those shown here. Scanners 103 may be nodes on Ethernet 108, and may be connected to the network, for example, via a RS-232 to Ethernet Converter, which is a third party device server. Scanners 103 and application server 110 may operate in a peer-to-peer mode, with each carrying out its many functions.

User terminals 111, workstations 1802, applications server 110, and database server 1804 may employ a logical three-tier architecture. The client tier (user terminals 111 and workstations 1802) may contain the Web browser that displays the application (see FIG. 14) and handle the front-end processing for the user. The middle tier, being the application server 110, may store the application logic and server software where the back-end processing for the invention takes place. The database tier may be the database server 1804 for storing and managing enterprise data 1806.

For a large enterprise network 108, a user 24 may employ a router to partition the network into a smaller logical sub-network of ALTSS components. This allows the sub-net to be fast and efficient in handling traffic for ALTSS 20. The local area network 108 may provide access to the Internet 109. For example, assuming that ALTSS 20 is located in a distant city 1808 and that a user 24 of ALTSS 20 located in a city in Maryland has permission to access ALTSS 20 files in an organization in the distant city, just as user 24 does to access any Web page over Internet 109, user 24 may use his/her browser to gain access to ALTSS 20 files in distant city 1808. After user 24 logs on to the distant site, a form's applet, for example (i.e. FIG. 14) and requested data may be presented to user 24 at his/her terminal as if user 24 were physically located at the distant site.

Figure 19:
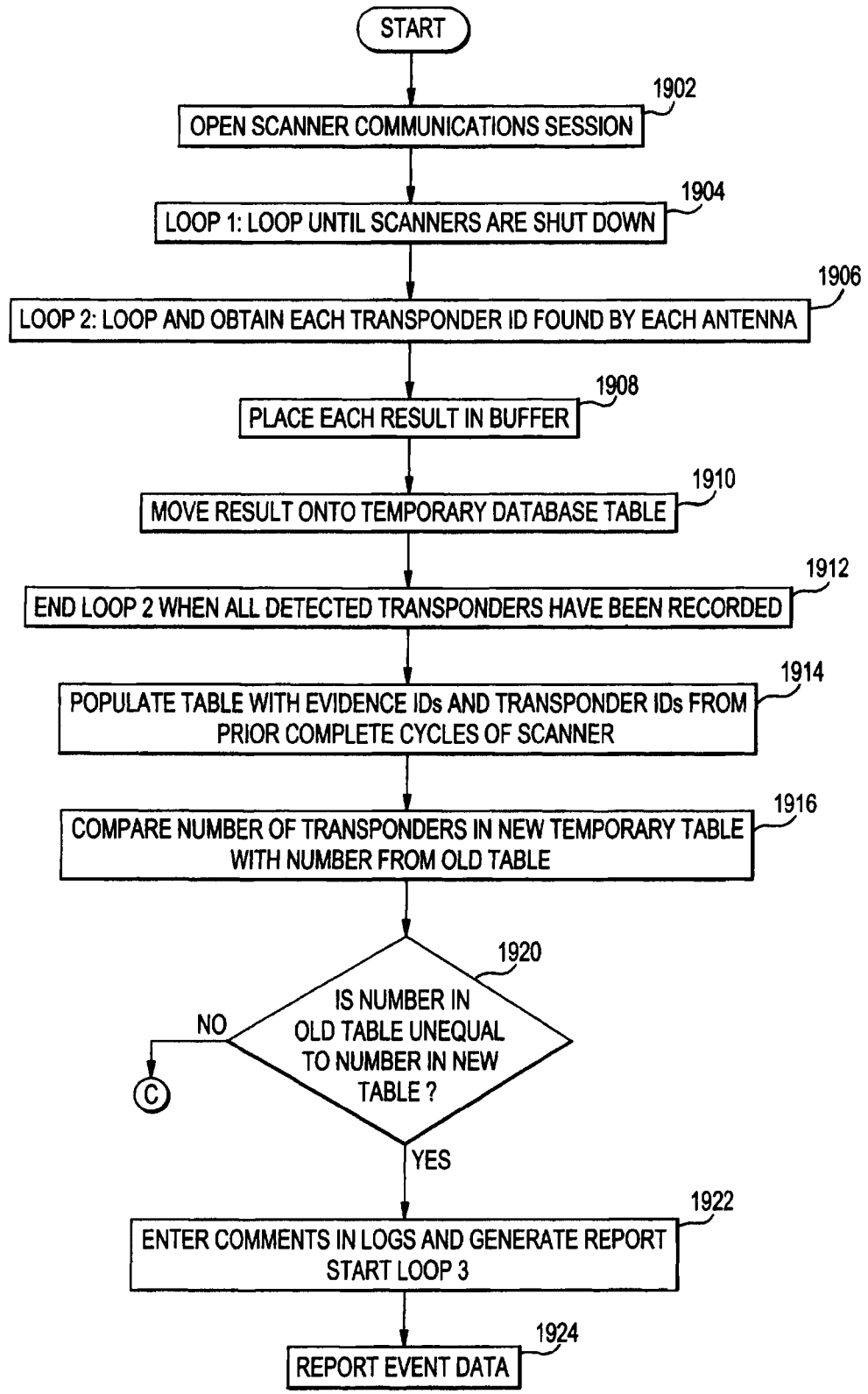
FIG. 19 is a flow chart of a process, consistent with this invention, for scanners in a network collecting event data from detected transponders and transmitting a request for polling to a back-end system is shown.

Referring, next to FIG. 19, a flow chart of a process, consistent with this invention, for scanners in a network collecting event data from detected transponders and transmitting a request for polling to a back-end system is shown.

As shown in FIG. 19, to start the back-end process, a scanner communications session may be established between server 110 and each scanner 103 (step 1902). Loop 1, the main loop; may start and continue until all scanners 103 are interrupted, disconnected manually, or disconnected by means of a timing mechanism (step 1904). Polling of the scanners may be accomplished by the back-end system in a deterministic or stochastic manner. Scanners 103 may unilaterally initiate requests for polling by scanner 103 based on some random event, such as the detection of a new transponder in an antenna's Field of view (step 1906). Scanner 103 involves the locating and tracking of physical evidence 22 in ALTSS containers 107.

Loop 2, an internal loop (step 1906), may start and each reported ID for transponder 104 (also referred to as transponder ID 104), along with the attendant ID for antenna 302 (also referred to as antenna ID 302), may be placed in a buffer (step 1908). This information may then be moved into a temporary database table (step 1910). Loop 2 continues until all detected transponder IDs 104 and antennas IDs 302 involved are recorded in the temporary table (step 1812). Loop 1 may continue until all scanners have reported their bindings (step 1904).

ALTSS 20 may then populate a table, designated the old table, with all transponder IDs 104 that have been attached to items of evidence and entered therein at an initial time (step 1914). A separate table, designated the evidence status table or new table, may contain the processed results and adjustments of evidence IDs and transponder IDs 104 from the last complete cycle of scanners 103. The system may then compare the number of transponder IDs 104 detected and placed in the temporary new table with the number of transponder IDs 104 known to be in the system at an initial time (i.e. those in the old table) (step 1916). Continuing from step 1916, if the number of transponder IDs 104 in the old table is not equal to the number in the temporary table (step 1920). ALTSS 20 may follow path "C" as shown in FIG. 7. If yes, ALTSS 20 may follow the path beginning with step 720 of FIG. 7. Alternatively, ALTSS 20 may also enter comments in logs and generate report in the location table (step 1922), start Loop 3 (see FIG. 7), and may also unilaterally report an event data to the server 110 to initiate polling (step 1924).

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A system for locating, identifying and/or tracking a transponder having a transponder ID, the system comprising:
   a storage device configured to store a known transponder ID and detection information associated with the stored known transponder ID, wherein the detection information indicates whether the stored known transponder ID has been previously detected by the system and whether the stored known transponder ID has not been previously detected by the system; and a processor configured to compare the known transponder ID stored in said storage device with a detected transponder ID, and determine based on the comparison whether the detected transponder ID is a detected known transponder ID and whether the detected transponder ID is not a detected known transponder ID.

2. The system of claim 1, wherein the detected transponder ID is identified as a previously detected transponder ID if the detection information associated with the stored known transponder ID indicates that the detected transponder ID has been previously detected.

3. The system of claim 1, wherein if said processor determines that the detected transponder ID has not been previously detected based on the detection information associated with the stored known transponder IDs, said processor further determines whether the detected transponder ID is a detected known transponder ID based on a comparison of the stored known transponder IDs with the detected transponder ID.

4. The system of claim 3, wherein if said processor determines that the detected transponder ID has not been previously detected and is associated with a stored known transponder ID, then said processor updates the detection information of the stored known transponder ID to indicate that the detected transponder ID has been previously detected.

5. The system of claim 1, wherein the previously undetected transponder ID comprises a transponder ID which is new to the system.

6. The system of claim 1, wherein said processor determines that the detected transponder ID is a detected known transponder ID if the detected transponder ID matches one of the stored known transponder IDs.

7. The system of claim 1, wherein the stored known transponder IDs are stored at a first field in the storage device, and the detection information is stored at a second field in the storage device.

8. The system of claim 1, wherein the processor is further configured to determine whether a transponder associated with the detected transponder ID is returning to the facility.

9. The system of claim 1, wherein said processor determines whether the detected transponder ID is associated with a stored known transponder ID, wherein if said processor determines that the detected transponder ID is not associated with a stored known transponder ID then said processor identifies the detected transponder ID as unknown.

10. The system of claim 1, wherein the detection information comprises a flag.

11. A system comprising:
a storage device configured to store a previously detected transponder ID and information associated with the stored transponder ID, the information indicating whether the stored transponder ID has been previously detected by the system and whether the stored known transponder ID has not been previously detected by the system; and
a processor configured to detect a transponder ID, compare the previously detected transponder ID from said storage device with the detected transponder ID, determine based on the comparison whether the transponder ID has been previously detected by the system, identify the detected transponder ID as a previously undetected transponder ID if the detected transponder ID has not been previously detected based on the comparison, and identify the detected transponder ID as a previously detected transponder ID if the detected transponder ID has been previously detected based on the comparison.

12. The system of claim 11, wherein the previously detected transponder IDs comprise transponder IDs that have been previously detected by said reader.

13. The system of claim 11, wherein said processor determines that the detected transponder ID is a detected known transponder ID if the detected transponder ID matches one of the stored known transponder IDs.

14. The system of claim 11, wherein the processor is further configured to determine whether a transponder associated with the detected transponder ID is returning to the facility.

15. A system comprising:
a storage device configured to store a known transponder ID and detection information associated with the known transponder ID, wherein the detection information indicates whether the known transponder ID has been previously detected by the system; and
a processor configured to detect a transponder ID, determine whether the detected transponder ID has been previously detected by the system based on the detection information stored in said storage device for the detected transponder ID, and identifying the detected transponder ID as new to the system if the detected transponder ID has not been previously detected based on a comparison of the known transponder ID with the detected transponder ID.

16. The system of claim 15, wherein the processor is further configured to determine whether a transponder associated with the detected transponder ID is returning to the facility.

17. A system for locating, identifying and/or tracking a transponder having a transponder ID, the system comprising:
a storage device configured to store a known transponder ID and detection information associated with the stored known transponder ID, wherein the detection information indicates whether the stored known transponder ID has been previously detected by the system; and
a processor configured to compare the known transponder ID stored in said storage device with a detected transponder ID, and determine based on the comparison whether the detected transponder ID is a detected known transponder ID and whether the detected transponder ID is not a detected known transponder ID.

18. The system of claim 17, wherein the detected transponder ID is identified as a previously detected transponder ID if the detection information associated with the stored known transponder ID indicates that the detected transponder ID has been previously detected.

19. The system of claim 18, wherein if said processor determines that the detected transponder ID has not been previously detected based on the detection information associated with the stored known transponder IDs, said processor further determines whether the detected transponder ID is a detected known transponder ID based on a comparison of the stored known transponder IDs with the detected transponder ID.

20. The system of claim 19, wherein if said processor determines that the detected transponder ID has not been previously detected and is associated with a stored known transponder ID, then said processor updates the detection information of the stored known transponder ID to indicate that the detected transponder ID has been previously detected.

21. The system of claim 17, wherein the previously undetected transponder ID comprises a transponder ID which is new to the system.

22. The system of claim 17, wherein said processor determines that the detected transponder ID is a detected known transponder ID if the detected transponder ID matches one of the stored known transponder IDs.

23. The system of claim 17, wherein the stored known transponder IDs are stored at a first field in the storage device, and the detection information is stored at a second field in the storage device.

24. A system comprising:
- a storage device configured to store a previously detected transponder ID and information associated with the stored transponder ID, the information indicating whether the stored transponder ID has been previously detected by the system; and
- a processor configured to detect a transponder ID, compare the previously detected transponder ID from said storage device with the detected transponder ID, determine based on the comparison whether the transponder ID has been previously detected by the system, identify the detected transponder ID as a previously undetected transponder ID if the detected transponder ID has not been previously detected based on the comparison, and identify the detected transponder ID as a previously detected transponder ID if the detected transponder ID has been previously detected based on the comparison.

25. The system of claim 24, wherein the previously detected transponder IDs comprise transponder IDs that have been previously detected by said reader.

26. The system of claim 24, wherein said processor determines that the detected transponder ID is a detected known transponder ID if the detected transponder ID matches one of the stored known transponder IDs.

* * * * *